US009277813B2

(12) United States Patent
Nelson et al.

(10) Patent No.: US 9,277,813 B2
(45) Date of Patent: Mar. 8, 2016

(54) MODULAR FURNITURE ASSEMBLY AND DISPLAY KIT WITH MAGNETIC COUPLING ASSEMBLY

(75) Inventors: Shawn D. Nelson, Norwalk, CT (US); David M. Underwood, Norwalk, CT (US)

(73) Assignee: Sac Acquisition LLC, Stamford, CT (US)

( * ) Notice: Subject to any disclaimer, the term of this patent is extended or adjusted under 35 U.S.C. 154(b) by 672 days.

(21) Appl. No.: 12/967,671

(22) Filed: Dec. 14, 2010

(65) Prior Publication Data

US 2012/0119629 A1    May 17, 2012

Related U.S. Application Data

(60) Provisional application No. 61/413,125, filed on Nov. 12, 2010.

(51) Int. Cl.
| | |
|---|---|
| *F16B 12/00* | (2006.01) |
| *H01F 7/02* | (2006.01) |
| *A47B 87/00* | (2006.01) |
| *A47C 13/00* | (2006.01) |
| *A47C 31/00* | (2006.01) |

(52) U.S. Cl.
CPC ............. *A47B 87/00* (2013.01); *A47C 13/005* (2013.01); *A47C 31/003* (2013.01); *F16B 12/00* (2013.01); *H01F 7/0252* (2013.01); *Y10T 24/32* (2015.01)

(58) Field of Classification Search
CPC ...... A47C 31/003; A47C 17/34; A47C 4/028; A47C 13/005; A47C 1/124; A47B 87/00; Y10T 24/32; F16B 12/00

USPC ................ 297/440.14, 233, 248; 403/DIG. 1
See application file for complete search history.

(56) References Cited

U.S. PATENT DOCUMENTS

| | | | | |
|---|---|---|---|---|
| 1,236,234 A | * | 8/1917 | Troje | .............................. 446/92 |
| 2,723,896 A | * | 11/1955 | Wurtz | ........................... 312/296 |
| 2,751,969 A | * | 6/1956 | Kruijt | ........................... 297/248 |
| 2,793,685 A | * | 5/1957 | Spitz | ........................ 297/411.27 |
| 2,870,824 A | | 1/1959 | Le Barre | |
| 3,030,146 A | | 4/1962 | Morris | |
| 3,137,012 A | | 6/1964 | Halterman | |

(Continued)

FOREIGN PATENT DOCUMENTS

| | | |
|---|---|---|
| CH | 403203 | 6/1966 |
| CN | 201022532 | 2/2008 |

(Continued)

OTHER PUBLICATIONS

Japanese Utility Model Application No. Sho 56-102375 (Japanese Utility Model Application laid-open No. Sho 58-8364), filed 1981, published 1983 (19 pages).

(Continued)

*Primary Examiner* — David R Dunn
*Assistant Examiner* — Tania Abraham
(74) *Attorney, Agent, or Firm* — Workman Nydegger

(57) ABSTRACT

A modular furniture assembly comprising a base and a transverse member has a convenient magnetic coupling assembly. A miniature display kit can be used in advertising or in a retail setting to display the benefits and optional positions of modular furniture. The display kit can have the same or essentially the same features as the modular furniture assembly.

43 Claims, 16 Drawing Sheets

(56) References Cited

U.S. PATENT DOCUMENTS

| | | | |
|---|---|---|---|
| 3,604,027 A * | 9/1971 | Konno | 5/697 |
| 3,606,461 A * | 9/1971 | Moriyama | 297/451.8 |
| 3,669,494 A | 6/1972 | Lohmeyer | |
| 3,706,473 A | 12/1972 | Mullen | |
| 3,787,909 A | 1/1974 | Johnson | |
| 3,811,728 A | 5/1974 | Redemske | |
| 3,944,281 A | 3/1976 | Piretti | |
| 3,973,800 A | 8/1976 | Kogan | |
| 4,045,090 A | 8/1977 | Fleisch et al. | |
| 4,047,773 A * | 9/1977 | Semany | 312/111 |
| 4,077,666 A | 3/1978 | Heumann | |
| 4,140,065 A | 2/1979 | Chacon | |
| 4,305,616 A | 12/1981 | Martinez | |
| 4,509,219 A * | 4/1985 | Yagi | 5/693 |
| 4,591,289 A * | 5/1986 | Vickers et al. | 403/322.4 |
| 4,626,218 A * | 12/1986 | Wright | 434/73 |
| 4,682,818 A | 7/1987 | Morell | |
| 4,753,480 A | 6/1988 | Morell | |
| 4,893,958 A * | 1/1990 | Wieland | 403/7 |
| 5,112,110 A | 5/1992 | Perkins | |
| 5,189,747 A | 3/1993 | Mundy et al. | |
| 5,322,345 A * | 6/1994 | Desser et al. | 297/214 |
| 2,701,009 A | 2/1995 | Richard | |
| 5,492,399 A | 2/1996 | Tillack | |
| 5,544,938 A * | 8/1996 | Saul et al. | 297/248 |
| 5,738,414 A | 4/1998 | Wieland et al. | |
| 5,867,849 A | 2/1999 | Pontrello | |
| 5,890,767 A | 4/1999 | Chang | |
| 6,063,007 A | 5/2000 | Sithole | |
| 6,151,765 A | 11/2000 | Asplund | |
| 6,216,894 B1 | 4/2001 | Hendricks | |
| 6,241,317 B1 | 6/2001 | Wu | |
| 6,267,446 B1 | 7/2001 | Wieland et al. | |
| 6,796,614 B1 | 9/2004 | Paul | |
| 6,824,220 B1 | 11/2004 | Davison | |
| 7,020,911 B2 | 4/2006 | Oldham | |
| 7,181,783 B2 | 2/2007 | O'Reilly | |
| 7,213,885 B2 | 5/2007 | White et al. | |
| 7,252,339 B2 | 8/2007 | Owens | |
| 7,296,859 B1 | 11/2007 | Branch | |
| 7,322,644 B2 * | 1/2008 | Bigolin | 297/201 |
| 7,399,034 B2 * | 7/2008 | Fullmer et al. | 297/217.3 |
| 7,419,220 B2 * | 9/2008 | White et al. | 297/440.14 |
| 7,448,689 B2 * | 11/2008 | Carter et al. | 297/440.14 |
| 7,481,496 B2 * | 1/2009 | Smith | 297/440.14 |
| 7,547,073 B2 * | 6/2009 | White et al. | 297/440.1 |
| 7,892,065 B2 * | 2/2011 | Vicentelli | 446/92 |
| 7,941,882 B1 * | 5/2011 | Strozer | 5/693 |
| 7,963,612 B2 | 6/2011 | Nelson | |
| 8,479,685 B2 * | 7/2013 | Sprung | 119/51.04 |
| 8,783,778 B2 | 7/2014 | Nelson et al. | |
| 2004/0021359 A1 | 2/2004 | Chang | |
| 2007/0085406 A1 | 4/2007 | White et al. | |
| 2007/0257539 A1 | 11/2007 | White et al. | |
| 2009/0251250 A1 * | 10/2009 | Tait et al. | 335/285 |
| 2009/0315382 A1 | 12/2009 | Nelson | |
| 2010/0196088 A1 * | 8/2010 | Johnsson | 403/291 |
| 2011/0233976 A1 | 9/2011 | Hanson et al. | |
| 2011/0298340 A1 | 12/2011 | Nelson | |
| 2012/0119629 A1 | 5/2012 | Nelson et al. | |

FOREIGN PATENT DOCUMENTS

| | | |
|---|---|---|
| DE | 1429323 | 10/1968 |
| EP | 2213205 A1 * | 8/2010 |
| JP | 536411 | 1/1978 |
| JP | S536411 | 1/1978 |
| JP | 2002-045256 | 2/2002 |
| WO | 2006135509 | 12/2006 |
| WO | 2006135855 | 12/2006 |

OTHER PUBLICATIONS

U.S. Appl. No. 11/745,325, Oct. 12, 2007, Office Action.
U.S. Appl. No. 11/745,325, May 28, 2008, Notice of Allowance.
U.S. Appl. No. 11/745,325, Jun. 13, 2008, Notice of Allowability.
U.S. Appl. No. 11/745,325, Aug. 13, 2008, Issue Notice.
U.S. Appl. No. 11/149,913, Aug. 15, 2006, Office Action.
U.S. Appl. No. 11/149,913, Dec. 12, 2006, Notice of Allowance.
U.S. Appl. No. 11/149,913, Jan. 12, 2007, Corrective Notice of Allowance.
U.S. Appl. No. 11/149,913, Apr. 18, 2007, Issue Notice.
U.S. Appl. No. 12/484,931, Sep. 10, 2010, Office Action.
U.S. Appl. No. 12/484,931, Oct. 25, 2010, Notice of Allowance.
U.S. Appl. No. 12/484,931, Jan. 5, 2011, Issue Notice.
U.S. Appl. No. 12/484,931, Feb. 16, 2011, Notice of Allowance.
International Search Report & Written Opinion for WO2006/135509 (10 pages), WO, Mar. 23, 2007
Extended EP Search Report for EP06770061.7 (9 pages), EP, May 10, 2013
International Search Report & Written Opinion for WO2006/135855 (10 pages), WO, Nov. 29, 2006
U.S. Appl. No. 13/164,721, filed Feb. 27, 2012, Office Action.
U.S. Appl. No. 13/164,721, filed Jul. 11, 2013, Final Office Action.
U.S. Appl. No. 11/149,913, Apr. 18, 2007, Issue Notification.
U.S. Appl. No. 12/484,931, Jan. 5, 2011, Issue Notification.
U.S. Appl. No. 12/484,931, Jun. 1, 2011, Issue Notification.
U.S. Appl. No. 13/164,721, Oct. 15, 2013, Notice of Allowance.
U.S. Appl. No. 13/164,721, Feb. 12, 2014, Issue Notification.
U.S. Appl. No. 13/164,721, Mar. 18, 2014, Notice of Allowance.
U.S. Appl. No. 13/164,721, Jul. 2, 2014, Issue Notification.

* cited by examiner

MODULAR FURNITURE ASSEMBLY AND DISPLAY KIT WITH MAGNETIC COUPLING ASSEMBLY

CONTINUITY DATA

This application claims priority to and the benefit of U.S. provisional patent application No. 61/413,125, filed Nov. 12, 2010, entitled MODULAR FURNITURE ASSEMBLY AND DISPLAY KIT WITH MAGNETIC COUPLING ASSEMBLY, which is incorporated herein, in its entirety, by reference.

FIELD OF THE INVENTION

This invention is in the field of modular furniture.

BACKGROUND

Modular furniture is useful in a variety of settings. Consumers eager to have options for arranging furniture in multiple ways can purchase modular furniture which will allow them to set up furniture assemblies in one of a plurality of different of manners.

In addition, many traditional couches and other furniture items cannot be moved into tight areas of a home or apartment complex, including, for example, basements, narrow hallways, or upstairs rooms. Thus, it is often desirable to produce furniture that can be conveniently assembled, disassembled and then reassembled in one of a variety of configurations, thus, providing versatility, diversity, and convenience for transport and set up.

Furniture assemblies have been developed in the past that provide the user with the opportunity to set up furniture in various different manners and to conveniently transport one portion of the furniture assembly at a time, rather than requiring the purchaser to negotiate a tight hallway with an entire sofa, for example.

However, the connections between modular assembly furniture pieces are often inconvenient, requiring too many steps for a convenient coupling of the various pieces together. It would therefore be desirable to provide modular furniture that is readily subject to assembly and disassembly and includes convenient connections between modular pieces.

BRIEF SUMMARY OF THE INVENTION

The present invention relates to a modular furniture assembly having a convenient magnetic coupling assembly. The present invention also relates to a miniature display kit to be used in advertising or in a retail setting to display the benefits and optional positions of modular furniture.

In one aspect, the modular furniture assembly of the present invention includes a base member, a transverse member, and a magnetic coupling assembly configured to enable the base member to be selectively, removably coupled to the transverse member. The transverse member can be employed adjacent the base as backrest and/or as an armrest. In further aspects of the invention, multiple transverse members are employed to provide a backrest and multiple arms rests.

In one embodiment, each of the transverse members has the same dimensions, i.e., the same height, width and length, such that a single base can be employed with multiple transverse members, forming a convenient chair when used in connection with a base member.

In yet a further aspect of the invention, multiple bases having the same dimensions and multiple transverse members having the same dimensions may be employed in order to provide the user with the opportunity to make a variety of different furniture configurations, as will be discussed and disclosed herein. The magnetic furniture assembly of the present invention enables the selective, removable coupling of the base members to the transverse members and/or the base members to each other.

In one embodiment, the base member comprises a dense foam housing and a plurality of magnets embedded within the foam housing. The transverse member also comprises a dense foam housing and a plurality of attractive members, e.g., metallic members embedded within the foam housing. The magnetic members of the base member attract the attractive members from the transverse member(s), thereby causing the transverse member(s) to be attracted to the base member and to couple against the base member when the magnetic forces of the base member are close enough to the transverse member(s) to cause the transverse member(s) to be coupled to the base member. By placing a transverse member in sufficient proximity to the base member that the magnetic forces of the base member pull the transverse member against the base member, the transverse member and base member are coupled to each other in such a manner that the furniture assembly can be used as furniture.

In one embodiment, the modular furniture assembly with a magnetic coupling assembly is designed for toddlers ages 2-4, for example, weighing less than about fifty pounds, for example, such that less powerful magnets may be employed. The toddlers can enjoy moving the modular pieces around into different configurations and can also enjoy using the furniture when placed into a configuration suitable for sitting or reclining, for example.

In yet another aspect of the invention, the relationships of the modular pieces can be employed in a display kit that allows potential purchasers to imagine the various configurations that can be created using the furniture. The display kit may be in form of blocks used in a customer service or advertising setting, for example.

U.S. Pat. Nos. 7,547,073 and 7,213,885, entitled "Modular Furniture Assembly" to White III, et al, each of which are incorporated herein by reference, disclose modular furniture assemblies in which a base and a transverse member, and/or multiple bases and transverse members, can be used in a variety of different configurations in light of their novel dimensions and relationships, such as $x=y+z$, wherein x is the length of the base, y is the width of the base, and z is the width of the transverse member. The display kit of the present invention displays various configurations that can be achieved using such a modular furniture assembly. The principles of the present invention can also be used as a display kit in connection with various other modular furniture assemblies.

In one aspect, the display kit includes a base member, a transverse member, and a magnetic coupling assembly configured to enable the base member to be selectively, removably coupled to the transverse member. The height "H" of the transverse member is significantly greater than the height "H" of the base member. The transverse member can be employed adjacent the base as backrest and/or as an armrest. In further aspects of the invention, multiple base and/or transverse members are employed. For example, in one aspect a base member is selectively, removably coupled to a first transverse member, which acts as a backrest, and to first and second side transverse members, which act as arm rests, when the user is sitting on the base member (a seating surface) with the user's back against the backrest.

The display kit may be comprised of blocks (e.g., wooden blocks) having magnets and/or metallic members therein to selectively, removably couple selected blocks to each other in a desired orientation. The magnets may be connected to the blocks through the use of an adhesive, for example.

The modular furniture assembly used for sitting and/or reclining uses magnetic coupling principles similar to those of the display kit and has a convenient magnetic coupling assembly, such that the components of the furniture assembly can be conveniently, selectively, removably coupled together. Optionally, in either the display kit or the modular furniture assembly to be used for sitting and reclining, the magnets may be located in the transverse member(s) while the metallic members are located in the base(s).

DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A-6B are representations of a display kit that can be employed to demonstrate to potential customers various configurations that can be achieved using a modular furniture assembly with a magnetic coupling assembly.

FIG. 1A is a representation of a display kit for a modular furniture assembly with a magnetic coupling assembly.

FIG. 1C shows various attractive forces ("A") between the base 12 and the transverse members 14.

FIG. 4B shows various attractive forces "A" and various repulsive forces "R" that either attract or repeal portions of the Modular Furniture Assembly such that the magnetic coupling assembly encourages proper orientation of respective components of the Modular Furniture Assembly.

FIGS. 6A-6B show examples of a system and method for packaging the display kit of FIGS. 1A-5C.

FIGS. 1A-5D are also representations of a modular furniture assembly for sitting and reclining, etc. having a convenient magnetic coupling assembly, such that the components of the modular furniture assembly can be conveniently coupled together. Thus, the assembly shown in FIGS. 1A-5D may represent (i) a miniature display kit in the form of blocks that can be used to demonstrate possible configurations of a modular furniture assembly on which users can sit and recline and/or (ii) an actual furniture assembly on which individuals sit or recline.

FIG. 7B is a representation of the chair of FIG. 7A with an armrest added.

DETAILED DESCRIPTION OF THE PREFERRED EMBODIMENTS

FIGS. 1A-6B are representations of a display kit that can be employed to demonstrate to potential customers various configurations that can be achieved using a modular furniture assembly with a magnetic coupling assembly. The display kit can be used in advertising or in a retail setting to simulate modular furniture and the various positions that modular furniture can be placed in. The display kit designs represented in FIGS. 1A-5D can be miniature handheld models that can be used by a store clerk, for example, to explain and display to customers the different positions that furniture can be placed in when employing the characteristics of modular furniture.

In another aspect of the invention, the depictions of FIGS. 1A-5D can represent actual furniture that individuals can sit or rest on, employing a magnetic coupling assembly to selectively, removably couple furniture pieces to each other.

Figure 1A:
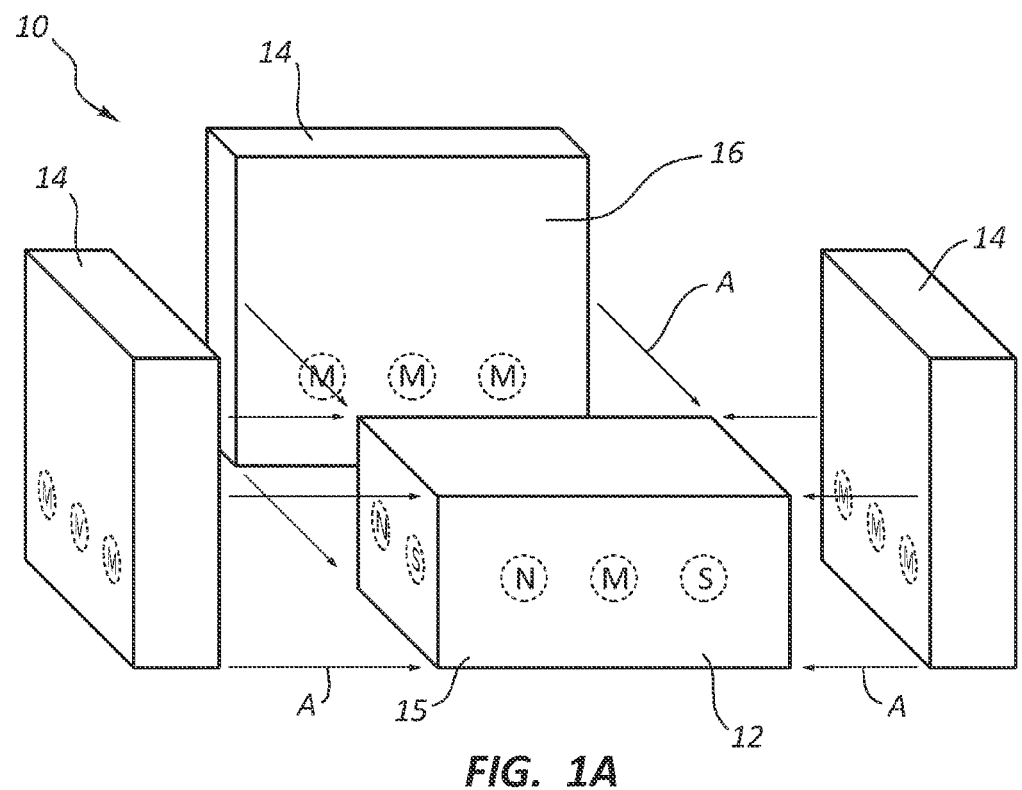
Figure 1B:
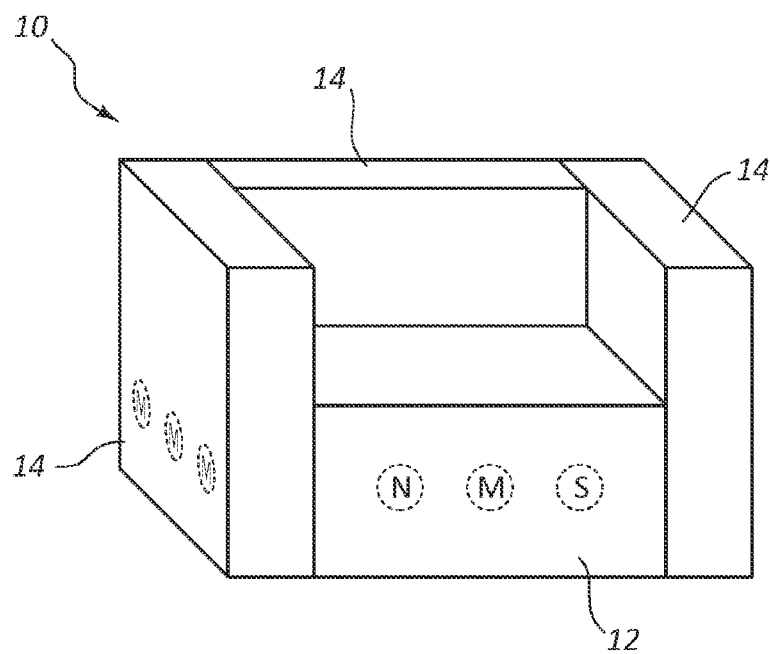
FIG. 1B is a view of the display kit displaying the furniture assembly of FIG. 1A in an assembled configuration.
Figure 1C:
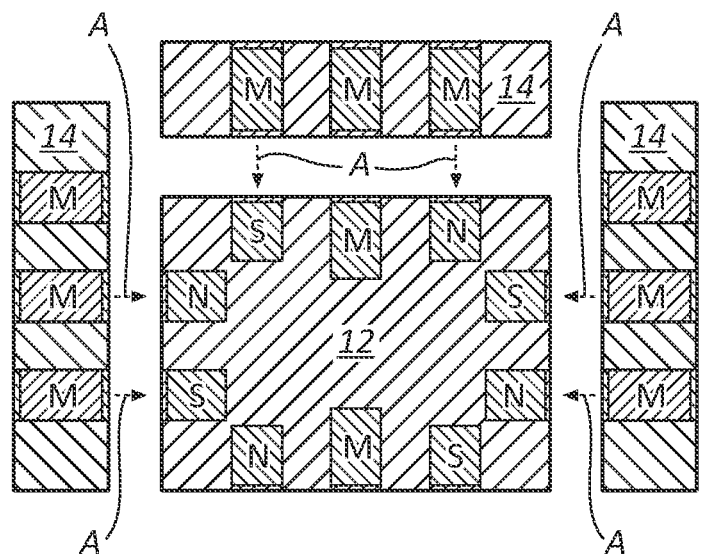
FIG. 1C is a cross-sectional representation of the display kit of FIG. 1A, the display kit having a base and three transverse members.
Figure 1D:
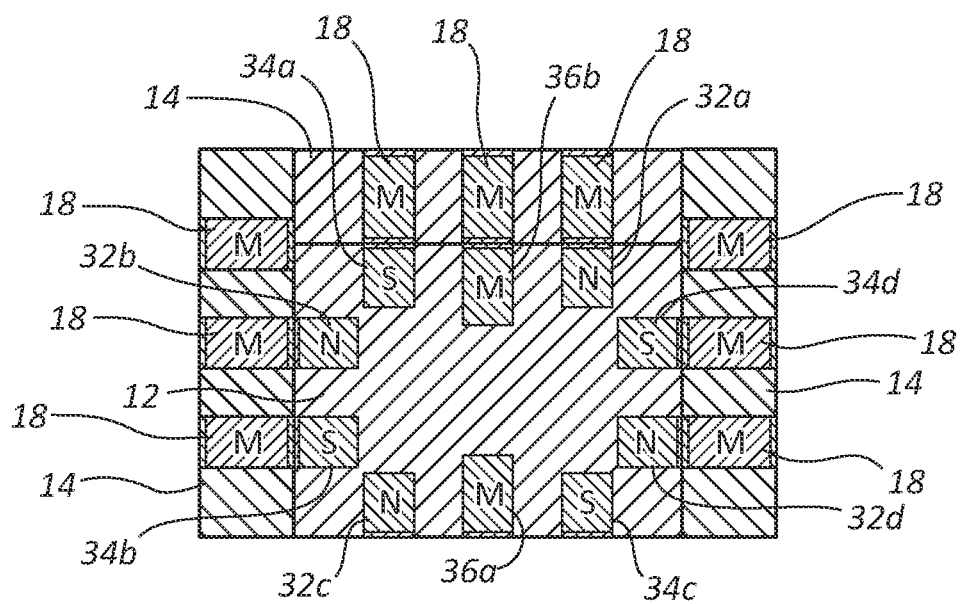
FIG. 1D is a cross-sectional representation of the Modular Furniture Assembly of FIGS. 1A-1C shown in an assembled view.

FIG. 1A is a representation of a display kit for a modular furniture assembly 10 with a magnetic coupling assembly, while FIG. 1B is a view of the furniture assembly 10 of FIG. 1A in an assembled configuration. FIGS. 1C and 1D show cross sectional views of the assembly 10 of FIGS. 1A, and 1B.

Modular furniture assembly 10 comprises a base member 12 and three transverse members 14 that are selectively, removably coupled by a magnetic coupling assembly to base member 12. As shown in FIG. 1A, the base member and transverse members may be rectangular prisms. The magnetic coupling assembly is comprised of at least one magnet and at least one attracted member, e.g., metal.

In the present disclosure, magnets that have a north end located on the periphery of base 12 are referred to as north magnets "N" while those magnets having a south end on the periphery of base 12 are referred to as south magnets "S". Attracted members, which are attracted to the magnets "N" or "S" are identified as "M", representing that the attracted members may be metallic members, for example, within respective transverse members 14 and bases 12. Although in one embodiment, the magnets may be placed in the transverse members, with the attracted members in the bases, in the embodiment shown, the magnets are located within the bases 12.

As shown in FIG. 1, each transverse member 14 is substantially taller than base member 12. Base member 12 has a length "X" (FIG. 2A) and transverse member has a length "X'" (FIG. 3A), that are substantially similar to each other. The length X of the base and the length X' of the transverse member are each substantially similar to the sum of the width "Y" of the base 12 and the width "Z" of the transverse member 14. Thus, X=Y+Z. In addition, X'=Y+Z.

Using the X=Y+Z relationships, a variety of different furniture configurations can be formed, as disclosed in U.S. Pat. Nos. 7,547,073 and 7,213,885, entitled "Modular Furniture Assembly" to White III, et al, each of which are incorporated herein by reference, and as reflected in FIGS. 1A-1D and FIGS. 5A-5D, for example.

Optionally, a single transverse member 14 may be employed to form a simple chair, two transverse members 14 may be employed to create a chair with a single arm rest, and three or more transverse members 14 may be employed to form the furniture assembly of FIG. 1B and/or the furniture assemblies further shown in FIGS. 5A-5D, for example.

With reference now to FIGS. 1A-1D and 2A-2D base member 12 will now be described in further detail. Base member 12 comprises a base body 15 such as a block, e.g. a wooden block. Body 15 has (i) a plurality of north magnets 32a-32d and south magnets 34a-34d, and (ii) a plurality of metallic members 36a, 36b disposed therein as shown in FIGS. 2A-2D. Such magnets and/or metallic members may be adhered via an adhesive, for example, or otherwise positioned within body 15 of base member 12. The blocks with the magnets and metallic members therein can be painted, for example. Thus, the magnetic coupling assembly of the present invention comprises at least one magnet and at least one attracted member, and preferably a plurality of magnets and attracted members. Magnets 32a-32d and 34a-34d are strategically oriented within body 15, so as to form an optimally positioned furniture assembly.

As shown in FIGS. 1C-1D and 2A-2D, body 15 has an oblong rectangular shape, i.e., body 15 is a non-square rectangle. Oblong rectangular base 12 has two opposing ends 22 and two opposing sides 24. Sides 24 are longer than ends 22 (see FIG. 2C).

The oblong rectangular base 12 has eight magnets therein, which are spaced about the periphery of base body 15 in an alternating polar relationship. Thus, the north magnets 32a-d and the south magnets 34a-d alternate with each other about the periphery of the base 15.

In between the north and south side magnets is a metallic member 36a, 36b, which enables proper connections to other bases, as shown and discussed herein. Metallic members 36a, 36b are placed along opposing sides 24 of base 12 so as to be attracted to the magnetic members of other bases 12 when it is desired to couple one base to another base.

Thus, the magnets of base 12 are placed in an alternating pattern such that a north magnet alternates with a south magnet, except that a metallic member is located between magnets on the sides 24 of base 12. As a result, identical bases 12, i.e., bases 12 having identical configurations and magnet patterns, can be connected to each other in an aligned relationship and can be used to form various configurations of base assemblies, as shown in FIGS. 1-5D.

Figure 2A:
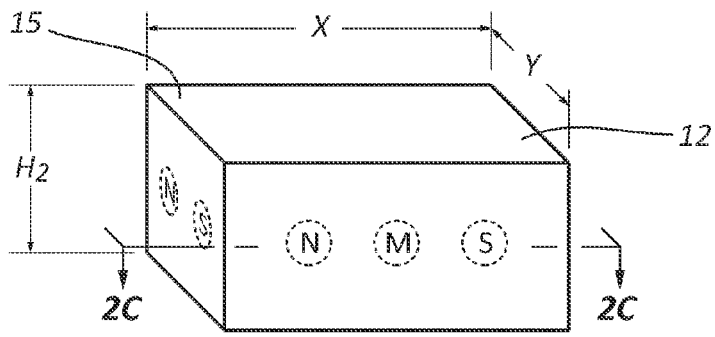
FIG. 2A is view of a base member of the furniture assembly shown in FIGS. 1A-1D.
Figure 2B:
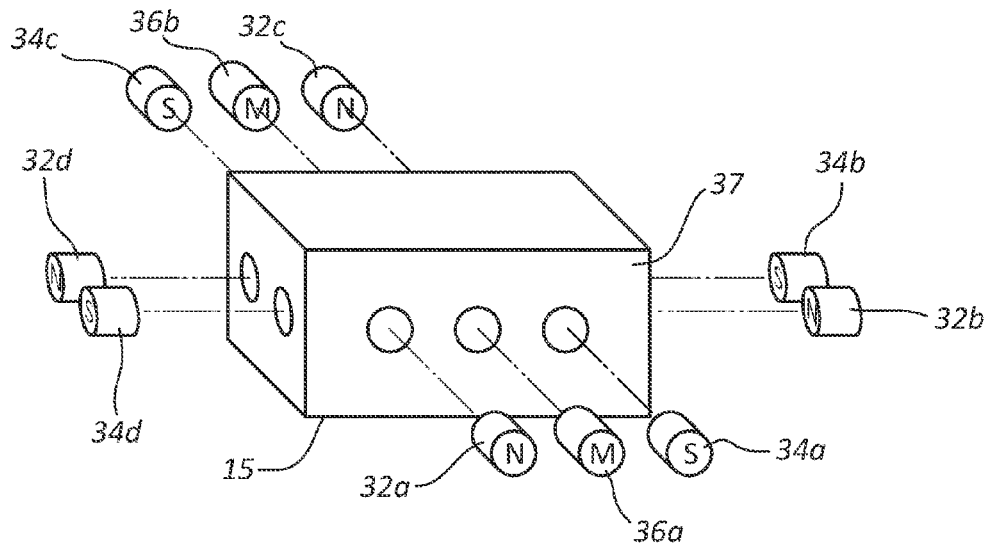
FIG. 2B is an exploded view of the base member of FIG. 2A.
Figure 2C:
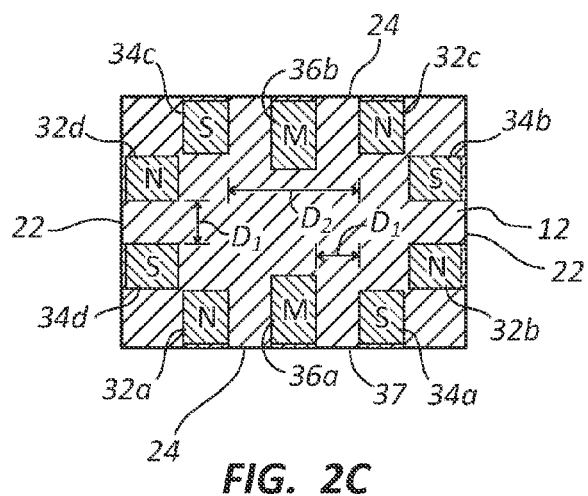
FIG. 2C is a cross-sectional view of base member of FIG. 2A.

The end magnets 32d, 34d and end magnets 32b, 34b are spaced from each other a distance "D1" (See FIG. 2c). Furthermore, side magnets 32a, 34a and side magnets 32c, 34c are each spaced from a corresponding adjacent metallic member 36a, 36b a respective distance D1. In addition, the side magnets 32a, 34a and side magnets 32c, 34c are spaced from each other a distance "D2".

Figure 3A:
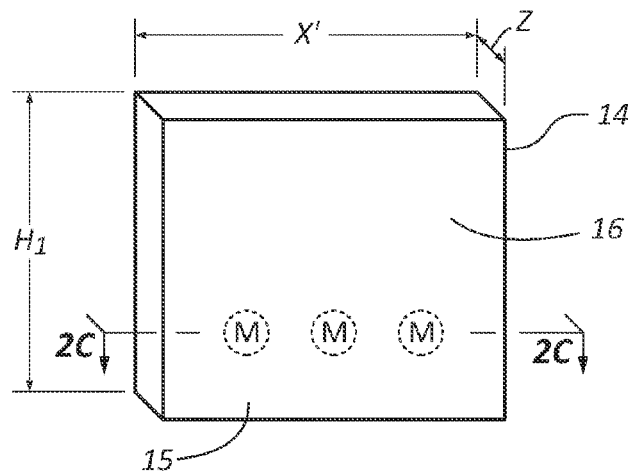
FIG. 3A is a representation of a transverse member of the Modular Furniture Assembly of FIGS. 1A-1D.
Figure 3B:
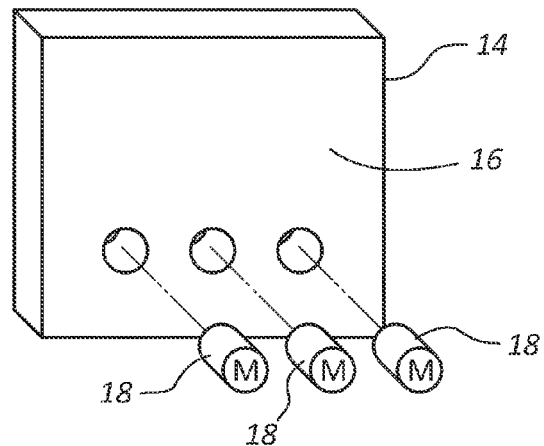
FIG. 3B is an exploded view of the transverse member shown in FIG. 3A.
Figure 3C:
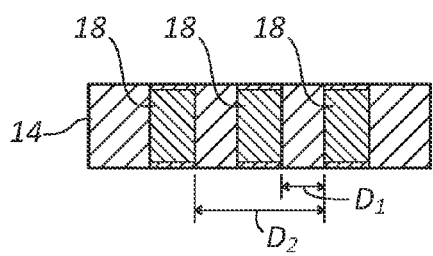
FIG. 3C is a cross-sectional view of the transverse member of FIG. 3A.

The distance "D1" also corresponds to the distance "D1" between adjacent metallic members 18 of the transverse members 14, as shown in FIG. 3C. There are three metallic members 18 of each transverse member 14. The distance "D2" corresponds to the distance "D2" between the outermost metallic members 18 (see FIG. 3c). Metallic members of transverse member 14 will connect to either north or south magnets.

Figure 3D:
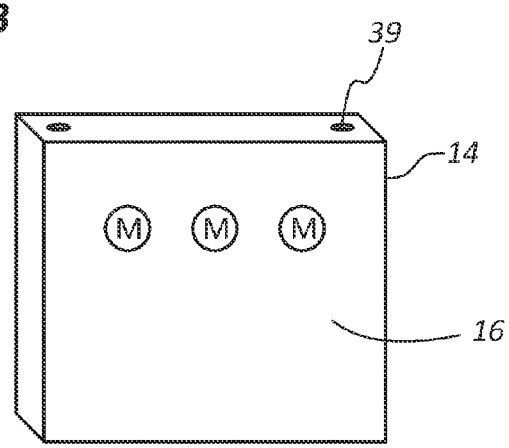
FIG. 3D is a representation of the transverse member of FIG. 3A, showing the bottom portion of the transverse member, the bottom having recesses therein that represent where feet configured to rest upon the ground can be placed.
Figure 4A:
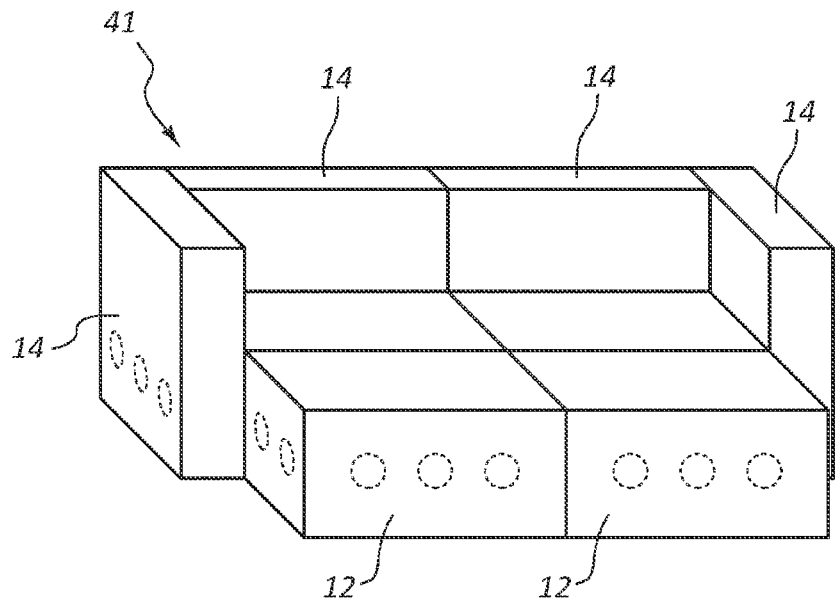
FIG. 4A is a representation of an assembled Modular Furniture Assembly of the present invention.
Figure 4B:
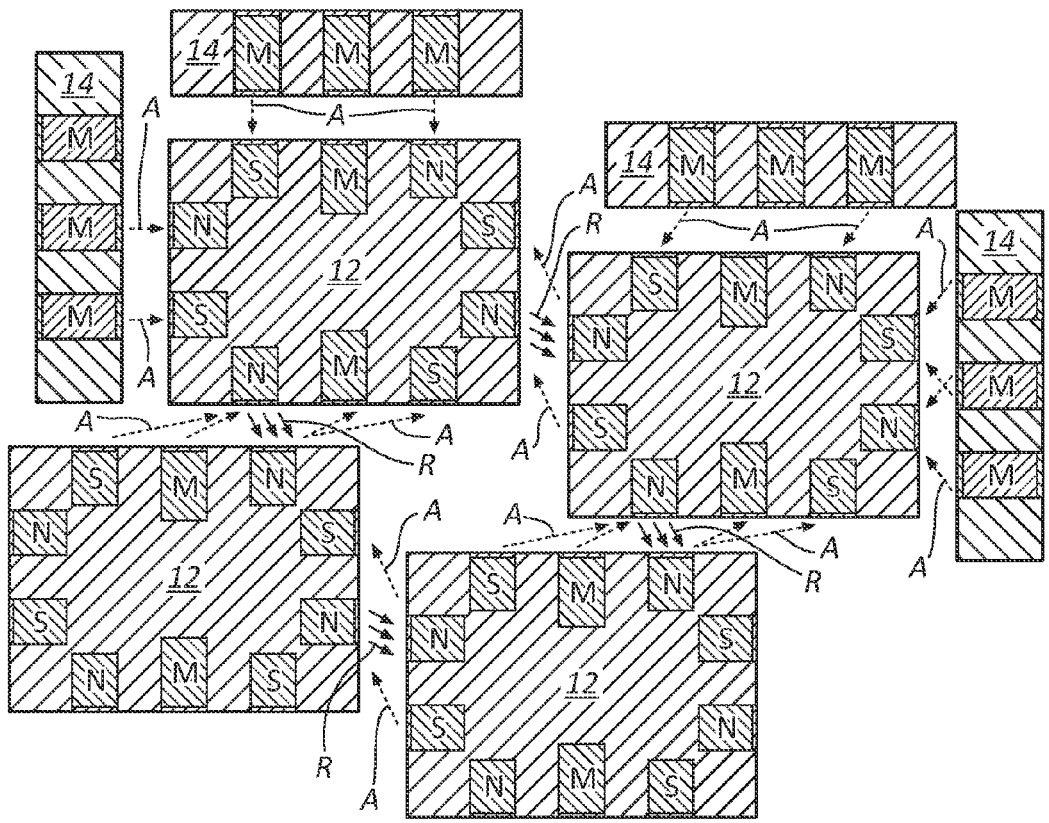
FIG. 4B is a cross-sectional representation of an unassembled Modular Furniture Assembly having the components of the Modular Furniture Assembly of FIG. 4A and showing the components of the magnetic coupling assembly.
Figure 5A:
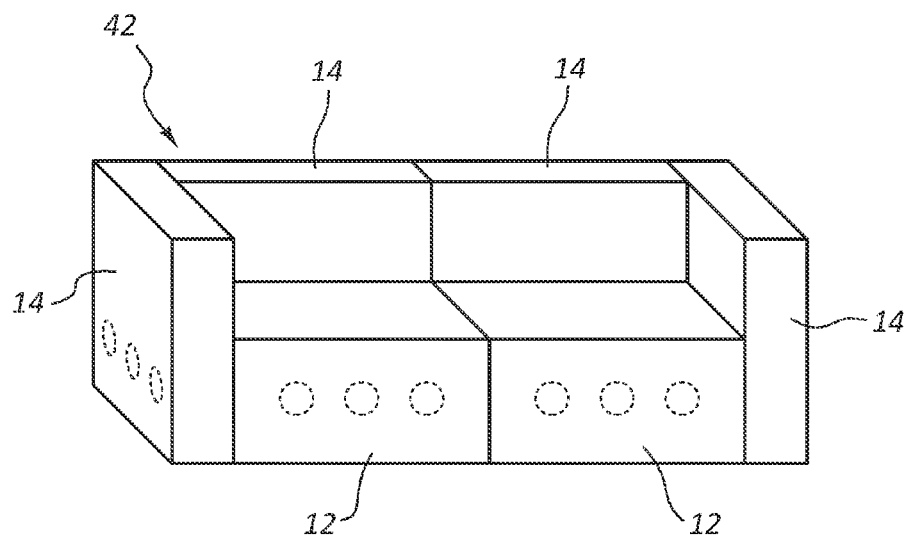
FIGS. 5A-5D are representations of additional display kits that represent assembled Modular Furniture Assemblies.
Figure 5B:
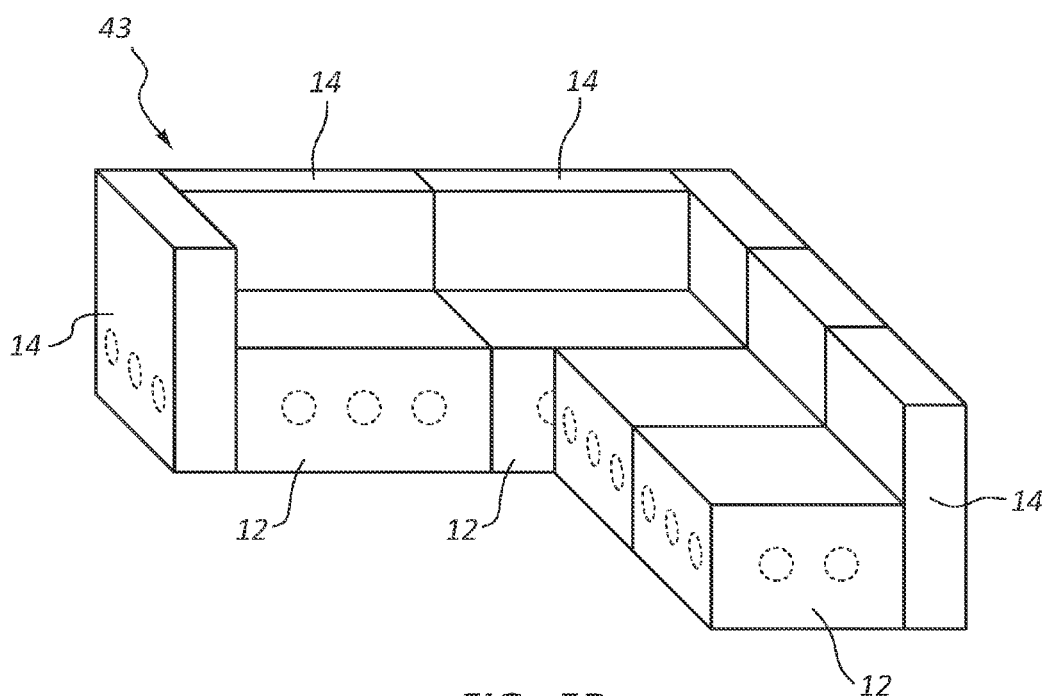
Figure 5C:
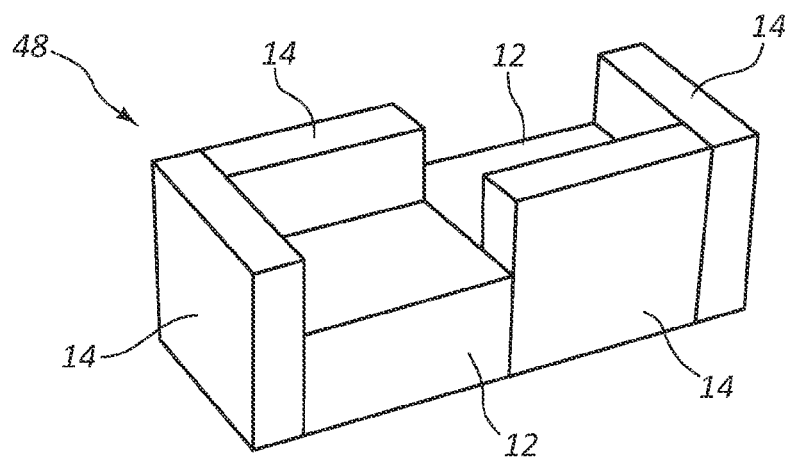
Figure 5D:
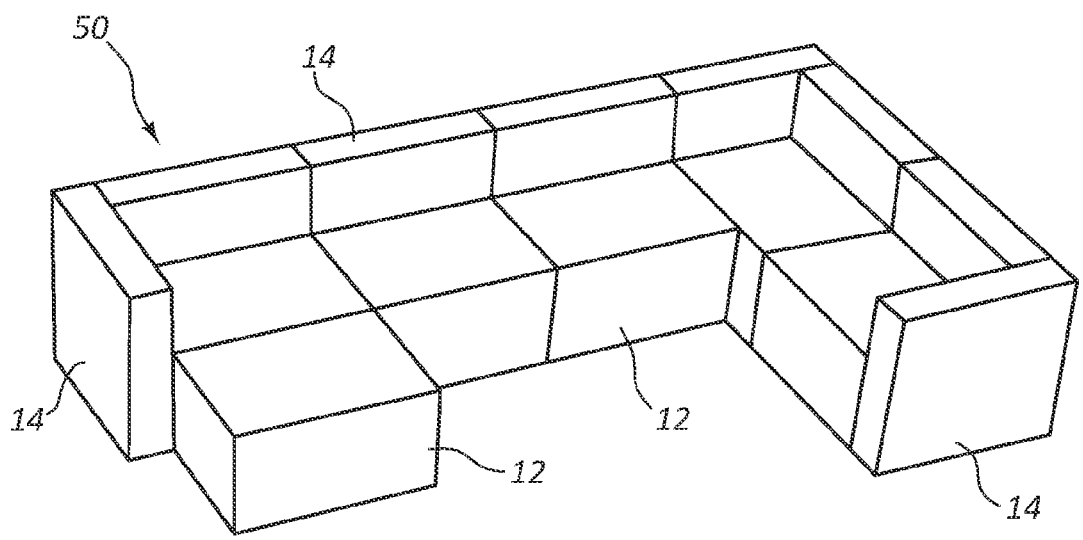

In light of this spacing and magnet placement pattern, a variety of different configurations of the modular furniture assembly can be formed, as shown in FIGS. 1-5D. For example, as shown in FIGS. 1A-1D, two metallic members 18 of respective transverse members 14 can be conveniently coupled to respective magnets at the ends 22 of base 12, while two metallic members 18 of a transverse member 14 can be coupled to two respective magnets on a side 24 of base 12. Furthermore, a side 24 of a base can be coupled to a side 24 of another base, and an end 22 of a base 12 can be coupled to an end 22 of another base 12, as shown in FIGS. 4a-4Bs. Optionally, an end 22 of a base 12 can be coupled to a side 24 of a base, as shown in FIGS. 5B and 5D.

The pattern of magnets with opposite polarity spaced in an alternating pattern about the periphery of oblong rectangular base 12 enables multiple identical bases to be attached to each other on the sides, ends and a variety of different combinations, as disclosed herein. A number of different combinations can also be achieved, as discussed and described throughout this specification and the accompanying drawings.

Base body 15 comprises a solid member, such as a wooden block having openings therein for placement of magnets and metallic members therein. However, in another embodiment, a different material may be used for body 15, such as a foam material, or a framework, lattice, or other material for body 15 may be employed that is configured to hold one or more magnets.

As shown in FIGS. 1A-1B, and further in FIGS. 3A-3D, transverse member 14 comprises a body 16, e.g., a wooden block, foam, or other frame or lattice, and a plurality of attracted members, such as metallic members 18 represented as "M", e.g., metallic slugs, which are attracted to the magnets of base member 12. The magnets and the metallic members 18 form a magnetic coupling assembly configured to selectively, removably couple base 12 to transverse member 14.

Transverse member 14 comprises a body 16, such as a block, e.g., a wooden block and a plurality of metallic members, e.g., the three metallic slugs 18 shown in FIG. 3B, which can be conveniently placed, for example, within holes located in the body 16 of transverse member 14, as reflected in FIGS. 3B and 3C.

In the embodiment of FIGS. 3A-3D, for example, metallic slugs 18 are disposed through corresponding holes in body 16 of transverse member 14 and are glued in place after which the transverse member 14 is painted, for example. The transverse member 14 can be equally attracted to the magnets of base 12 in either a front or back orientation.

FIG. 1C shows various attractive forces (represented as Force "A") between the base 12 and the transverse members 14. As reflected in FIG. 1C, base 12 attracts one or more transverse members 14 that are placed in sufficient proximity to base member 12 such that the magnets of base member 12 attract the metallic members "M" of transverse member 14. Once the base member 12 and the transverse members 14 of FIG. 1A are placed in sufficient proximity with each other, the magnetic coupling assembly causes the furniture assembly to conveniently orient into the chair assembly of FIGS. 1B and 1D. When the metallic members of transverse members 14 are placed in sufficient proximity to the magnetic members of base 12, the attractive forces "A" of the magnets cause the transverse members 14 to be conveniently aligned into a desired position with respect to each other.

The strength of the magnets can be adjusted based on the specific needs e.g. whether the members of FIG. 3D are to be employed as furniture or to be employed as display models to display how furniture can be arranged.

In the embodiment shown, bases 12 and transverse members 14 can have recesses 38, 39 (FIGS. 2d, 3d) e.g., shallow recesses or other holes, respectively, therein to simulate where feet might be placed that touch the ground, during use, as shown in U.S. Pat. Nos. 7,547,073 and 7,213,885, entitled "Modular Furniture Assembly" to White III, et al, each of which are incorporated herein by reference, for example.

FIGS. 4A-4B are cross-sectional representations of a Modular Furniture Assembly having a magnetic coupling assembly. FIG. 4A shows various attractive forces "A" and various repulsive forces "R" that either attract or repeal portions of the Modular Furniture Assembly such that the magnetic coupling assembly encourages proper orientation of respective components of the Modular Furniture Assembly.

As shown in FIG. 4A, the attractive forces pull the transverse members such that the transverse members are conveniently pulled to a desired orientation so as to fit in the assembled position. Thus, the magnetic coupling assembly assists somewhat in orienting the bases 12 transverse members 14 into the proper location once they have generally been placed into sufficient proximity to each other that the magnetic forces attract them into the appropriate positions.

Therefore, complex furniture assemblies can be conveniently formed using respective magnets and metallic members. Thus, using the four base members 12 and the four transverse members 14 of FIGS. 4A-B, the sofa with foot rest assembly of FIG. 4A can be conveniently configured and positioned with the components being located in precise locations in a very quick and efficient manner.

This dynamic of causing proper orientation is particularly useful when more complex furniture assemblies are formed, as shown in FIGS. 5A-5D. The user can move the pieces close to each other while relying on the magnetic coupling assembly to provide precise positioning for the members once the members are oriented into a generally correct location.

By employing the magnetic coupling assembly of the present invention, it is possible to achieve the desired relationship of the length x being substantially equal to the width y of the base and the width z of the transverse member in complex furniture assemblies. As a result, a variety of precisely oriented furniture configurations can be selectively, removably coupled to each other through the use of the magnetic furniture assembly.

Figure 2D:
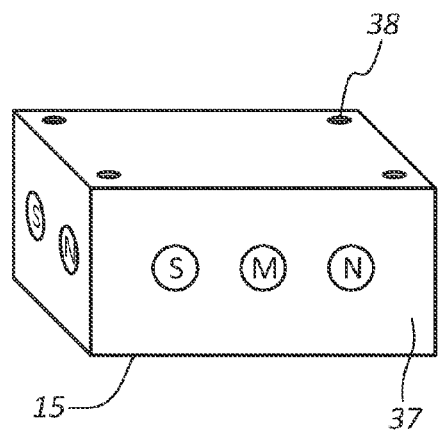
FIG. 2D is a representation of a base of FIG. 2A, showing the bottom portion of the base, the bottom having recesses therein that represent where feet configured to rest upon the ground can be placed.

It is also possible to achieve various positions by flipping base(s) 12 upside down, such as shown in FIG. 2D, and achieving additional relationships with bases 12 and transverse members 14.

The designs of FIGS. 1A-5D can be used as a small display kit so that a salesperson, for example, can show customers the potential relationship of modular furniture assembly have generally the same relative dimensions, but on a larger scale. FIGS. 1A-5D are also representations of a modular furniture assembly for sitting and reclining, etc. having a convenient magnetic coupling assembly, such that the components of the modular furniture assembly can be conveniently coupled together. Thus, the assembly shown in FIGS. 1A-5D may represent (i) a miniature display kit in the form of blocks that can be used to demonstrate possible configurations of a modular furniture assembly on which users can sit and recline and/or (ii) an actual furniture assembly on which individuals sit or recline.

The height "H" of the transverse member 14 is significantly greater than the height "H" of the base member 12. In one embodiment, "significantly greater" means that the transverse member is at least 20% greater in height than the base member.

In one embodiment, in which the assembly 10 is used as a display kit for a modular furniture assembly, the dimensions of the base 12 are as follows: the length, X=about 2 inches, the height, H2=about 1 inch, and the width, i.e., Y=about 1.5 inches. In one such embodiment, the dimensions of transverse member 14 are as follows: the length X'=about 2 inches, the width, Z=about 0.5 inches, and the height, i.e., H1=about 1.75 inches. In such an embodiment, the magnets of base 12 can be about 6 millimeters in diameter, for example, and about 8 millimeters in length, for example, while the metal slugs are, in one embodiment, about 6 millimeters in diameter and about 12 millimeters in length, for example.

The magnets and the metallic slugs of base 12 and transverse member 14 are each approximately the same distance from the bottoms of base 12 and transverse member 14 such that the magnets and slugs are aligned with each other when the bases and transverse members are placed adjacent to each other. In one embodiment, the magnets on the ends of base 12 are spaced approximately ¼ inch from each other and the magnets on the sides of base 12 are spaced approximately ¼ inch away from the metallic member placed between the magnets on the sides of base 12. In such an embodiment, the metallic members of transverse member 14 can be spaced approximately ¼ inch from each other. Thus, the magnets and metallic members are configured to be aligned with each other so as to selectively, removably couple bases 12 and transverse members 14 to each other in a convenient fashion as shown and described herein.

Figure 6A:
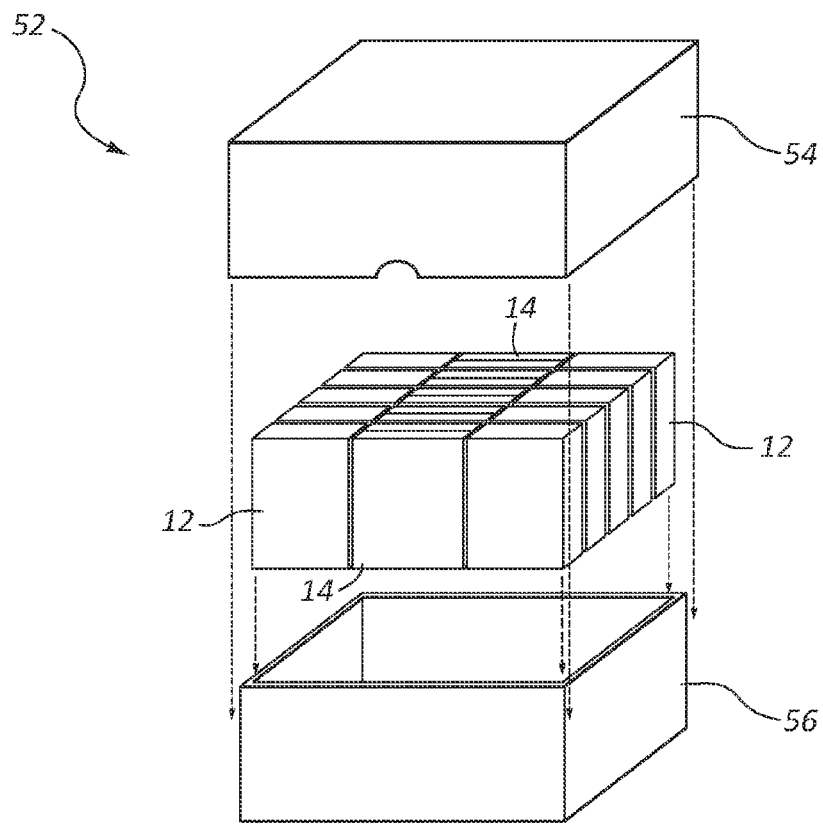
Figure 6B:
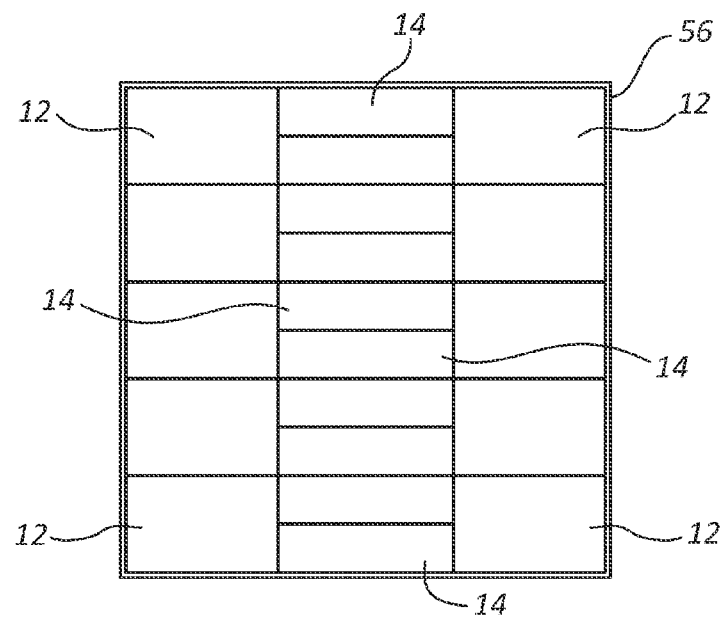

FIGS. 6A-6B show examples of a system and method for packaging the display kit of FIGS. 1A-5C.

With reference now to FIGS. 6A and 6B, a convenient storage assembly 52 can be employed to store large quantities of bases 12 and transverse members 14. As shown in FIG. 6A, because of the x=y+z dimensions of bases 12 and 14, the bases 12, 14 fit conveniently into a square storage assembly 52, which comprises container 56 and lid 54.

Container 56 can contain five bases on the left side and five bases 12 on the right side while ten transverse members 14 (and/or five bases) may be oriented in the central portion of the container, as shown in FIGS. 6A and 6B. Lid 54 may be conveniently placed thereon. Thus the base members 12 and transverse members 14 of modular furniture assembly 10 can be conveniently stored and shipped in a storage assembly 52.

Figure 7A:
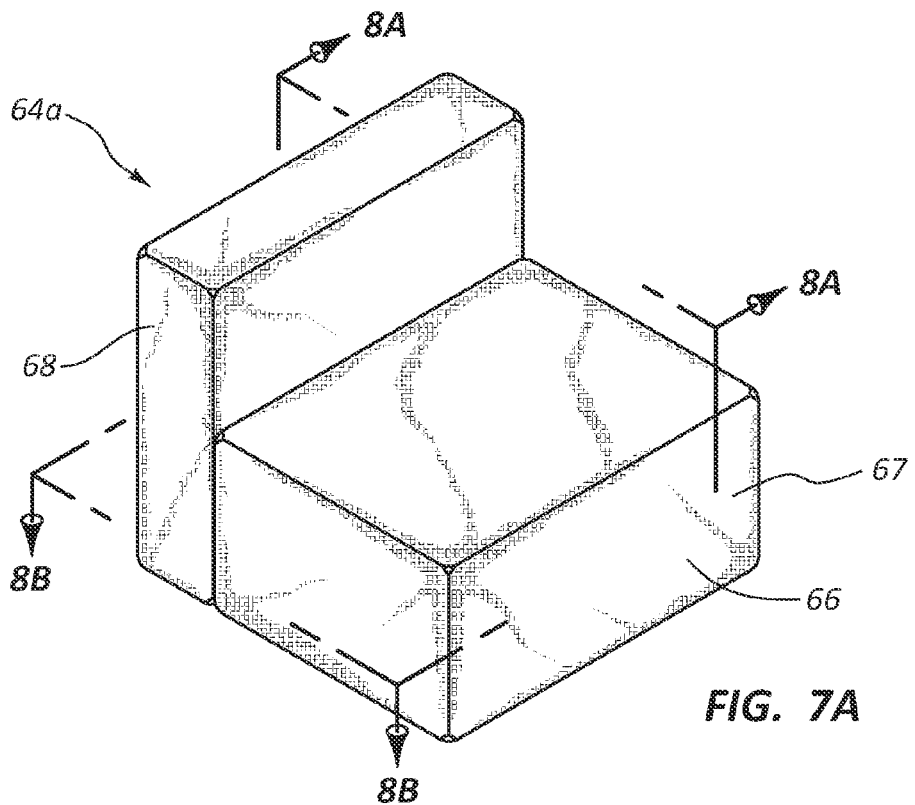
FIGS. 7A-7B represent depictions of a modular furniture assembly of the present invention comprising a foam body having a magnetic coupling assembly. The magnets may be embedded in the foam in a similar manner to that disclosed in the embodiments of FIGS. 1A-5C, for example. In one embodiment, the magnets are embedded in the foam of FIGS. 7a-7b in a manner similar to that disclosed in FIGS. 1A-5C, except that the magnets are connected to each other using connection cords, such as a non-metallic cable, e.g., a rope, string, plastic line, monofilament, etc. The magnets embedded in the foam may be donut shaped, for example, with a hole therein so as to have the cable conveniently tied thereto, for example.
Figure 7B:
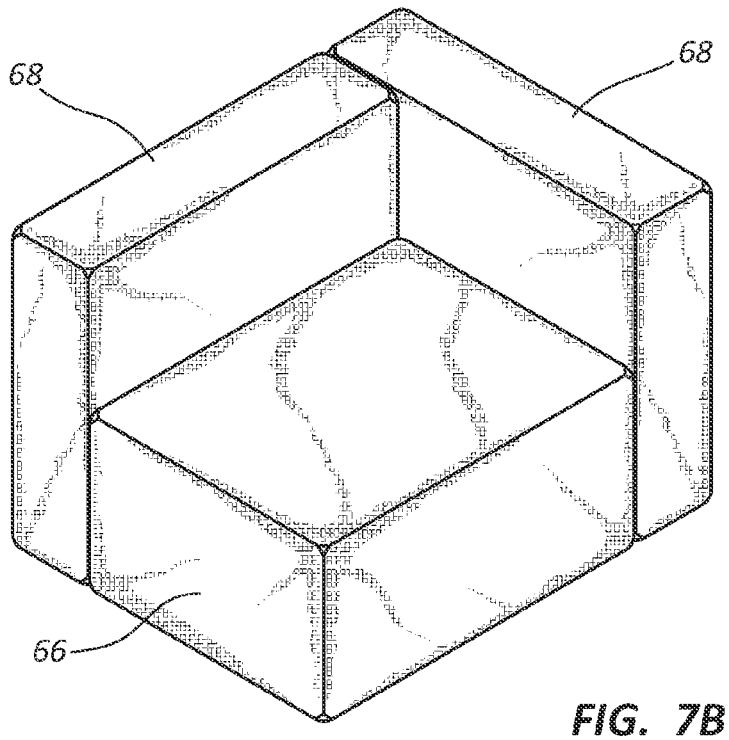

Turning now to FIGS. 7A-7B, these Figures represent depictions of a modular furniture assembly 64*a* of the present invention comprising a body, e.g., a foam body, having a magnetic coupling assembly therein. The magnets may be embedded in the foam body in a similar manner to that disclosed in the embodiments of FIGS. 1A-5C, for example. In the embodiment shown, the magnets are embedded in the foam body of FIGS. 7*a*-7*b* in a manner similar to that disclosed in FIGS. 1A-5C, with a difference being that the magnets are connected to each other using connection cords, such as a non-metallic cable, e.g., a rope, string, plastic line, monofilament, etc. The magnets embedded in the foam may be donut shaped, for example, having a hole therein, so as to have the cable conveniently coupled thereto, for example, such as being tied thereto, or otherwise connected.

FIG. 7B is a representation of the chair of FIG. 7A with an armrest added.

With reference now to FIGS. 7A through 9I, the modular furniture assembly designs of the present invention can be employed in a setting in which the bodies of the base and transverse members are comprised of a foam material, e.g., a foam that is dense enough for an individual, such as a toddler or small child to use for sitting or reclining.

With reference to FIGS. 7A-B and 8A-B, for example, modular furniture assembly 64 comprises a base 66 and a transverse member 68 in the form of a backrest. The height of the transverse member 68 is substantially greater than the height of the base 66. One or more additional transverse members 68 may be added, as shown in FIG. 7B and FIGS. 9*a*-9I.

Figure 8A:
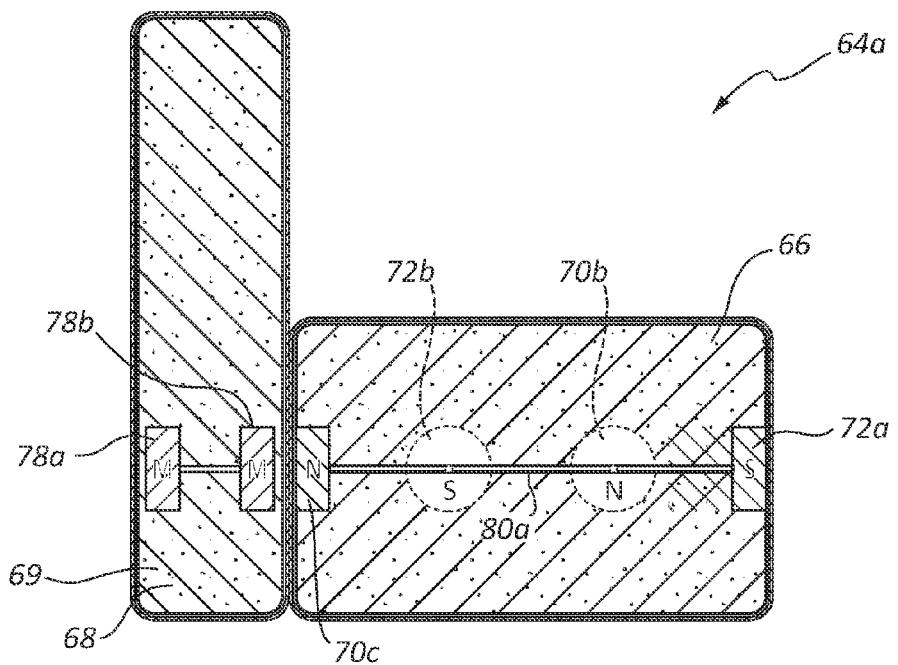
FIGS. 8A and 8B are cross-sectional representations of the chair of FIG. 7A, illustrating possible methods for linking magnets of the modular coupling assembly.
Figure 8B:
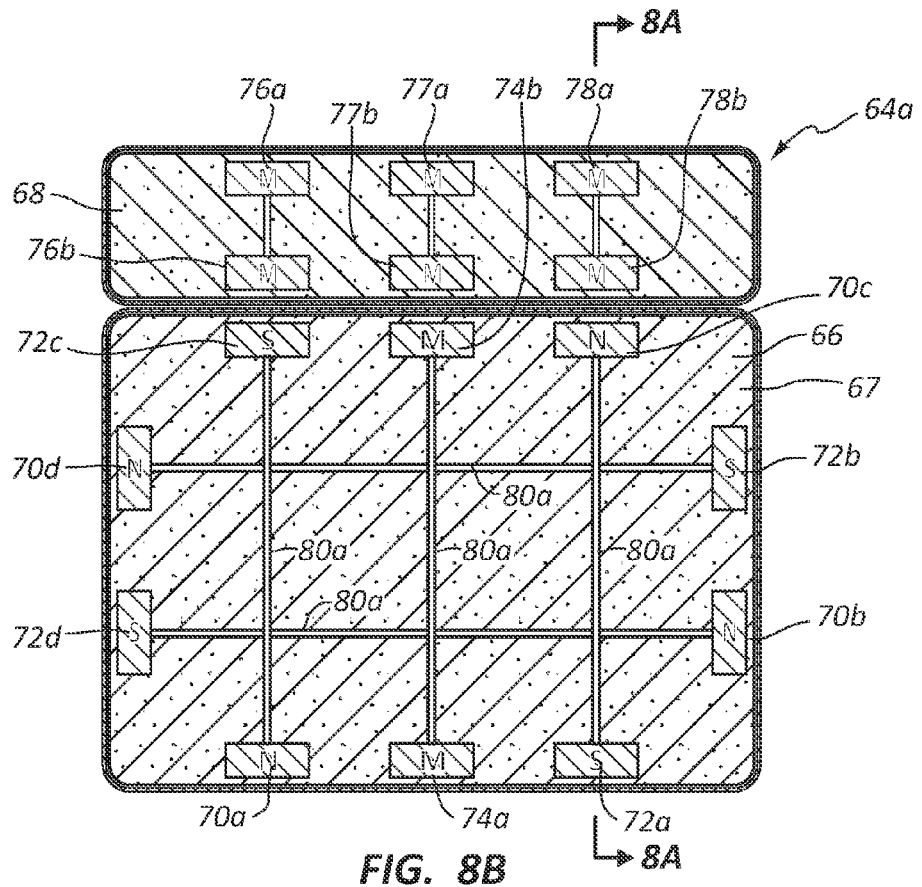

FIGS. 8A and 8B are cross-sectional representations of the chair of FIG. 7A, illustrating possible methods for linking magnets of the magnetic coupling assembly. As shown, base 66 comprises a foam body 67 having a plurality of magnets 70*a-d* (north magnets), 72*a-d* (south magnets), and a plurality of metallic members 74*a-b* therein. Body 67 may optionally be comprised of other materials, but is in one embodiment comprised of a dense foam material.

Transverse member 68 comprises a dense foam body 69 having a plurality of metallic members 76*a-b*, 77*a-b*, and 78*a-b* therein. Body 69 may optionally be comprised of other materials, but is in one embodiment comprised of a dense foam material.

Also as shown in FIGS. 8A and 8B, metallic members 76*a-b*, 77*a-b*, and 78*a-b* therein of transverse member 66 and metallic members 74*a-b* of base 64 are tethered with an opposing member to form a tethered metallic member assembly. The tethered metallic member assembly has a similar configuration to that shown in FIG. 10. The tethering of metallic members to each other enables the metallic members to be on the peripheral sides of the transverse member, but use less weight than a solid member. By tethering one metallic member to the other, e.g., by respective cords, movement of one member causes movement of the other, which provides some connected relationship and unifying, cohesive structure within the dense foam.

In the embodiment of FIGS. 8A-8B, connection cords also extend between opposing magnets, forming convenient tethered magnetic assemblies. By tethering one magnet to the other, movement of one magnet causes movement of the other, which provides some connected relationship within the dense foam.

Figure 9A:
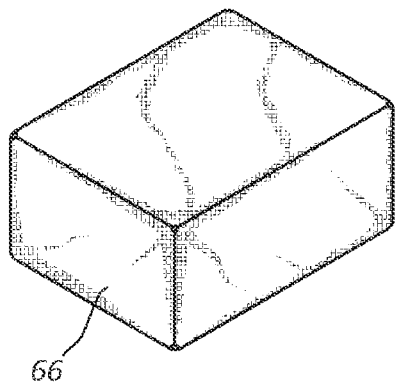
FIGS. 9A through 9I show various furniture assembles that can be formed using modular components of the present invention, all of which are examples of Modular Furniture Assemblies of the present invention with magnetic couple assemblies.
Figure 9B:
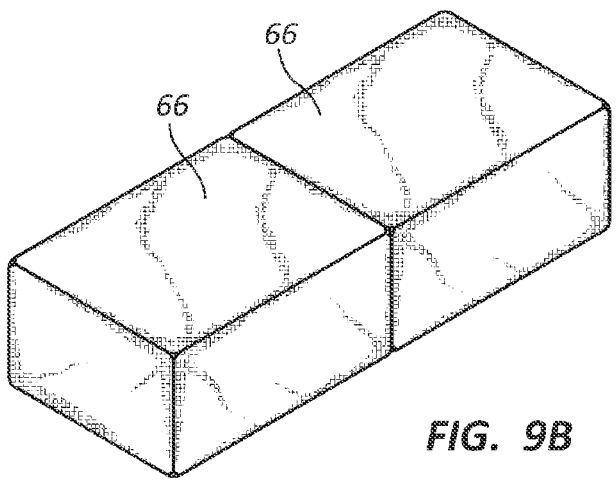
Figure 9C:
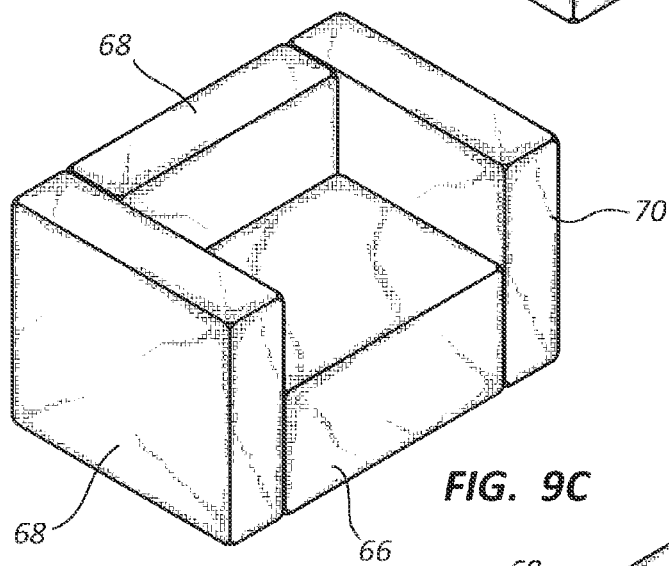
Figure 9D:
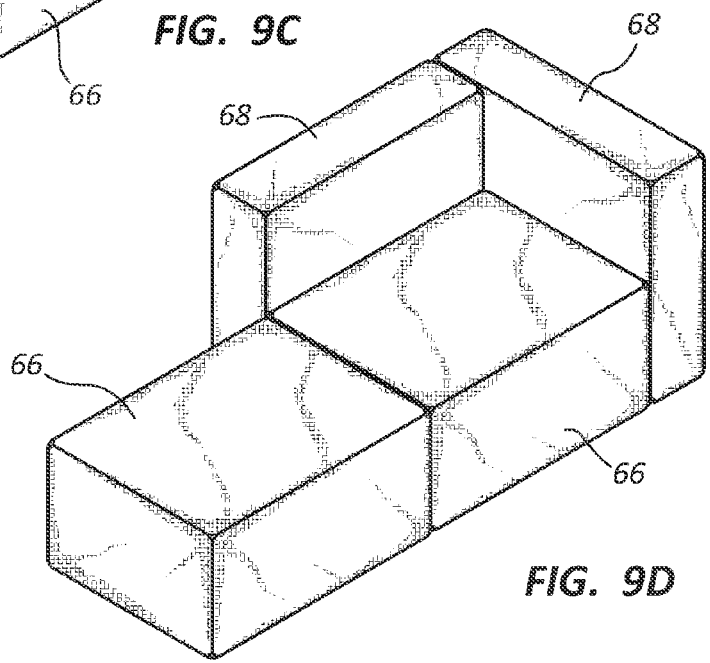
Figure 9E:
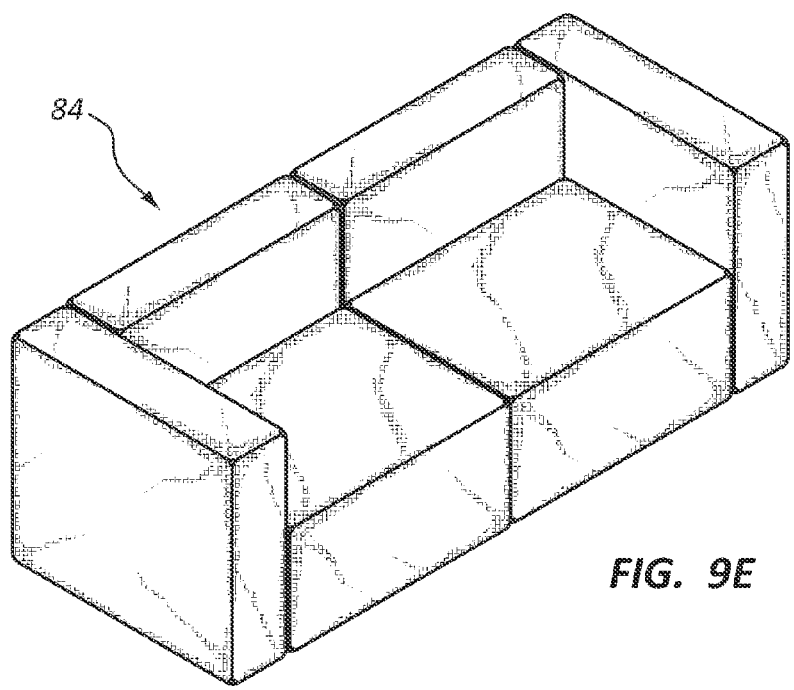
Figure 9F:
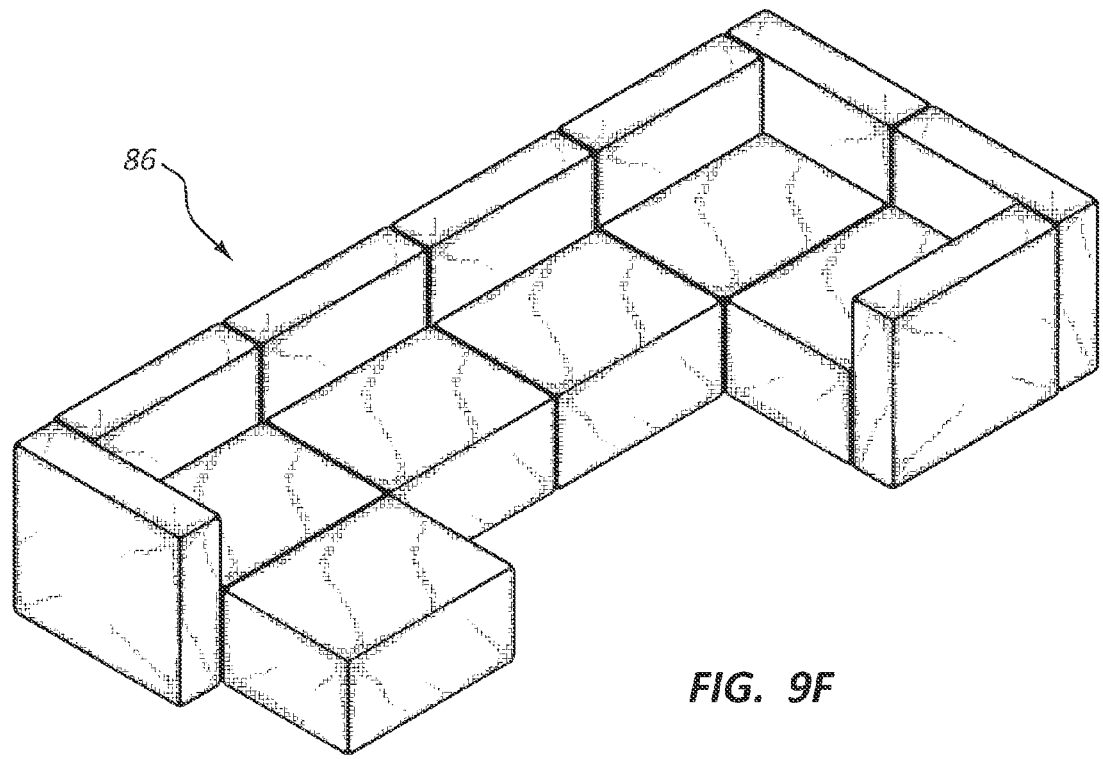
Figure 9G:
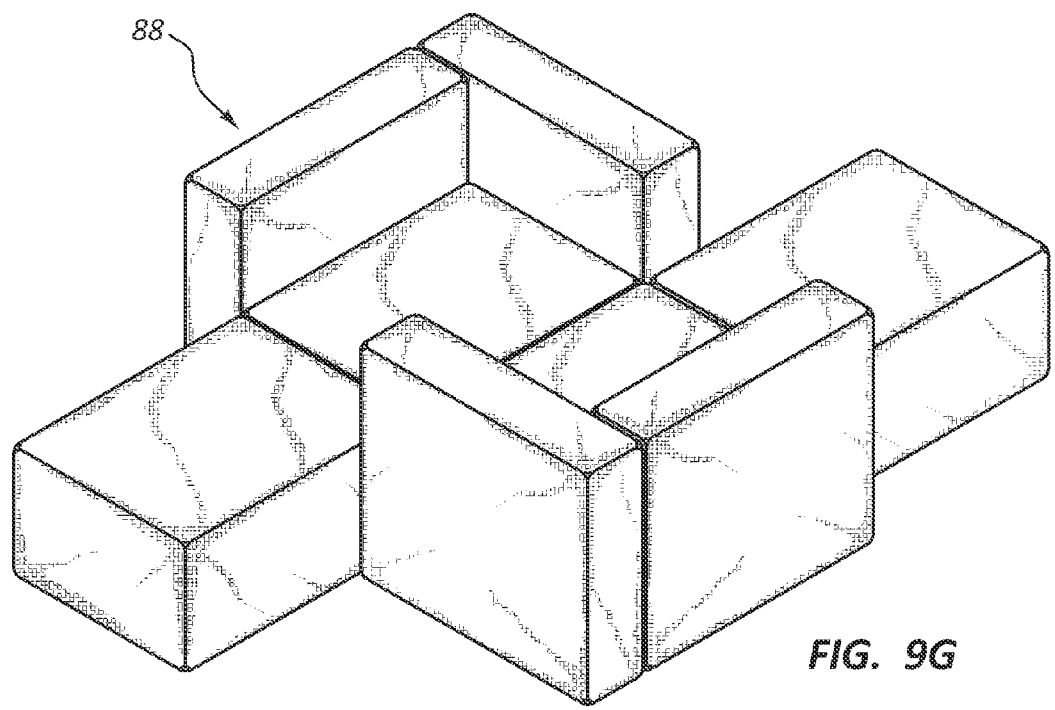
Figure 9H:
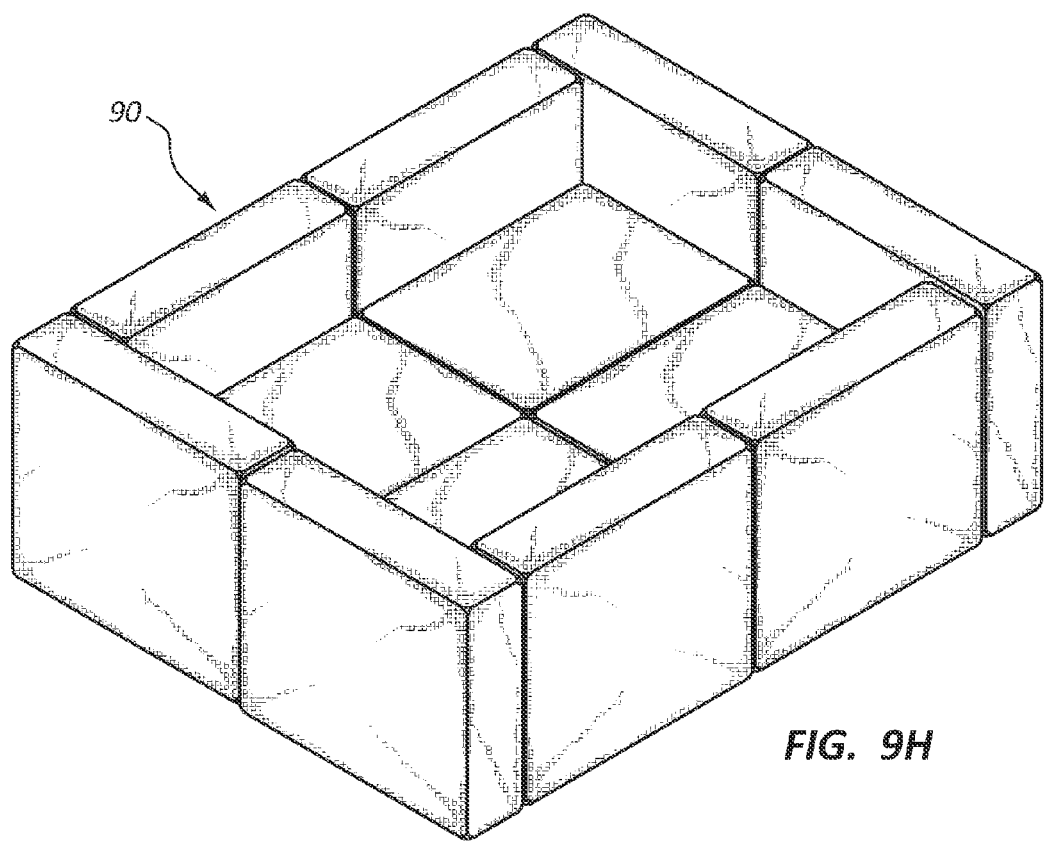
Figure 9I:
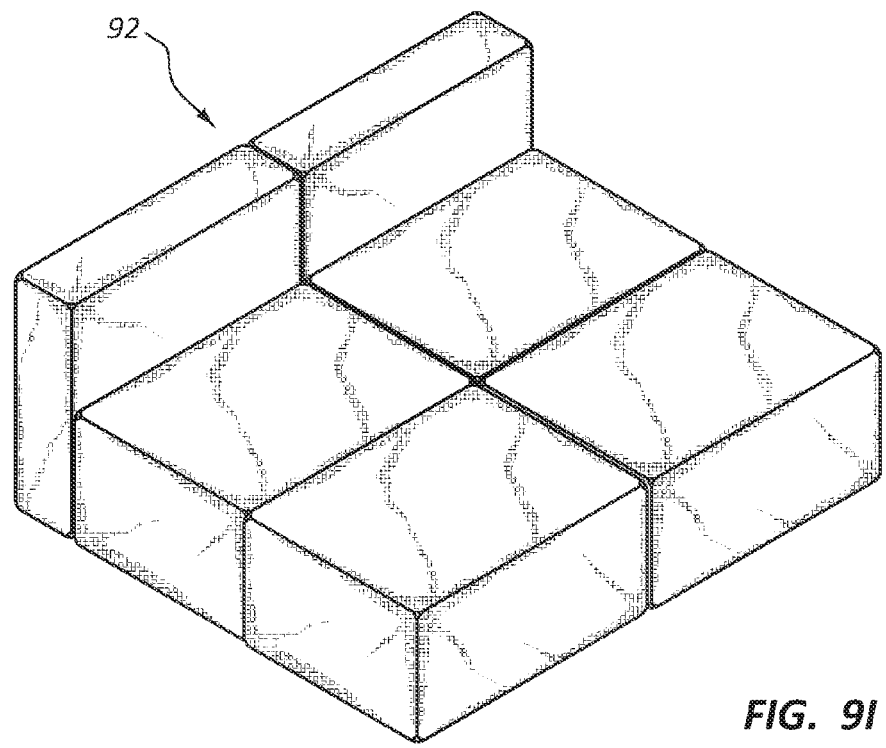
Figure 10:
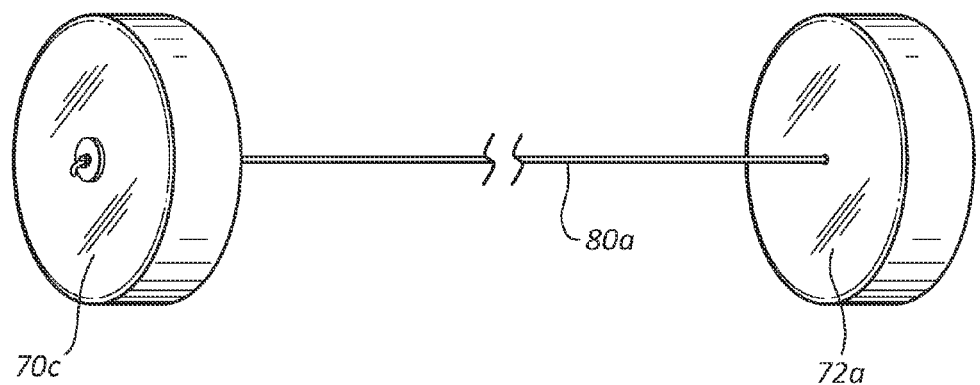
FIG. 10 demonstrates an example of how magnets are linked to each other within the modular furniture assembly of FIG. 7A, for example.

The connection cords for the magnets and/or metallic members may be comprised of a non-metallic cable, e.g., a rope, string, plastic line, twine, monofilament, etc. and may be connected to the magnets and/or metallic members through a variety of different manners, such as illustrated, for example in FIG. 10, wherein a cord 80*a* connects two magnets 70C and 72*a*. The linking of the magnets provides additional stability and a unifying, cohesive structure within the foam bodies. Thus, by linking magnets and/or metallic members, as shown in FIGS. 8-10, the movement of one magnet is tied to the movement of another magnet. Thus, if an individual moves a transverse member, the adjacent magnets of a connected base will move with the transverse member, as will magnets linked to the adjacent magnets, causing the base to move as a cohesive unit.

In the embodiment of FIGS. 8A-8*b*, individual magnets are linked through individual cords 80*a*. However, the magnets may be linked through a variety of different manners to provide unifying structure.

Figure 8C:
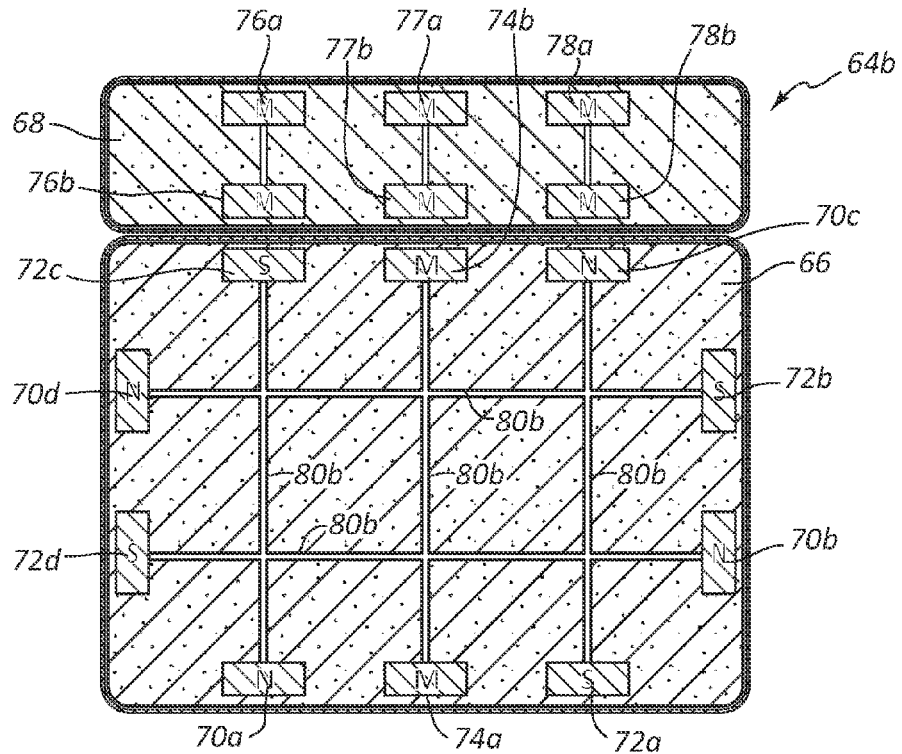
FIGS. 8C-8E are cross-sectional representations of other chairs similar to the chair of FIG. 7A, showing additional methods for linking magnets of the modular coupling assembly.
Figure 8D:
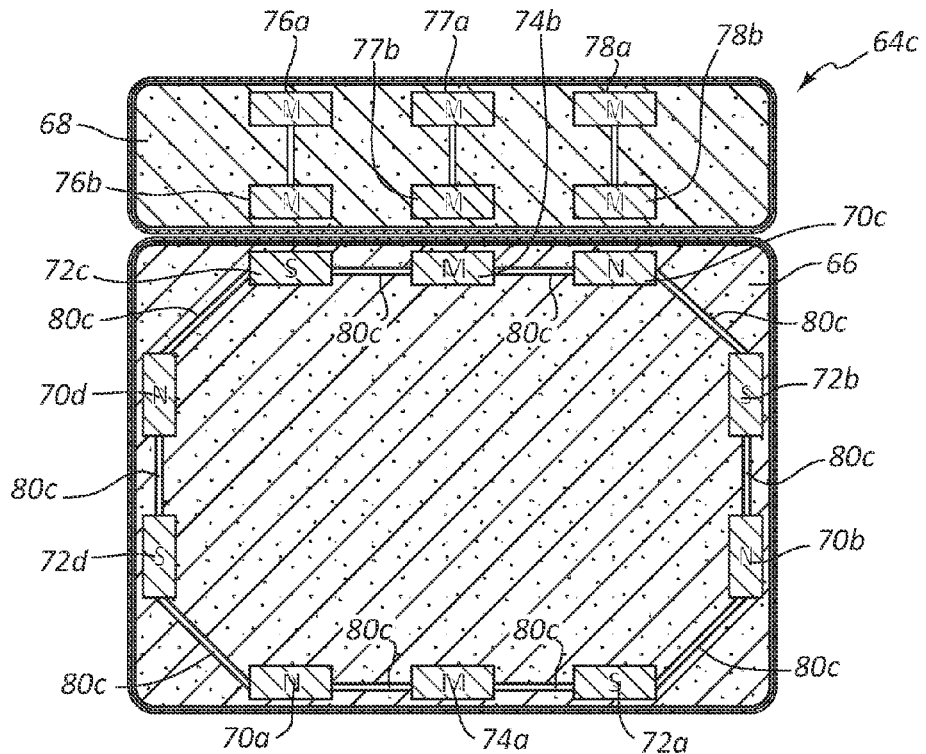
Figure 8E:
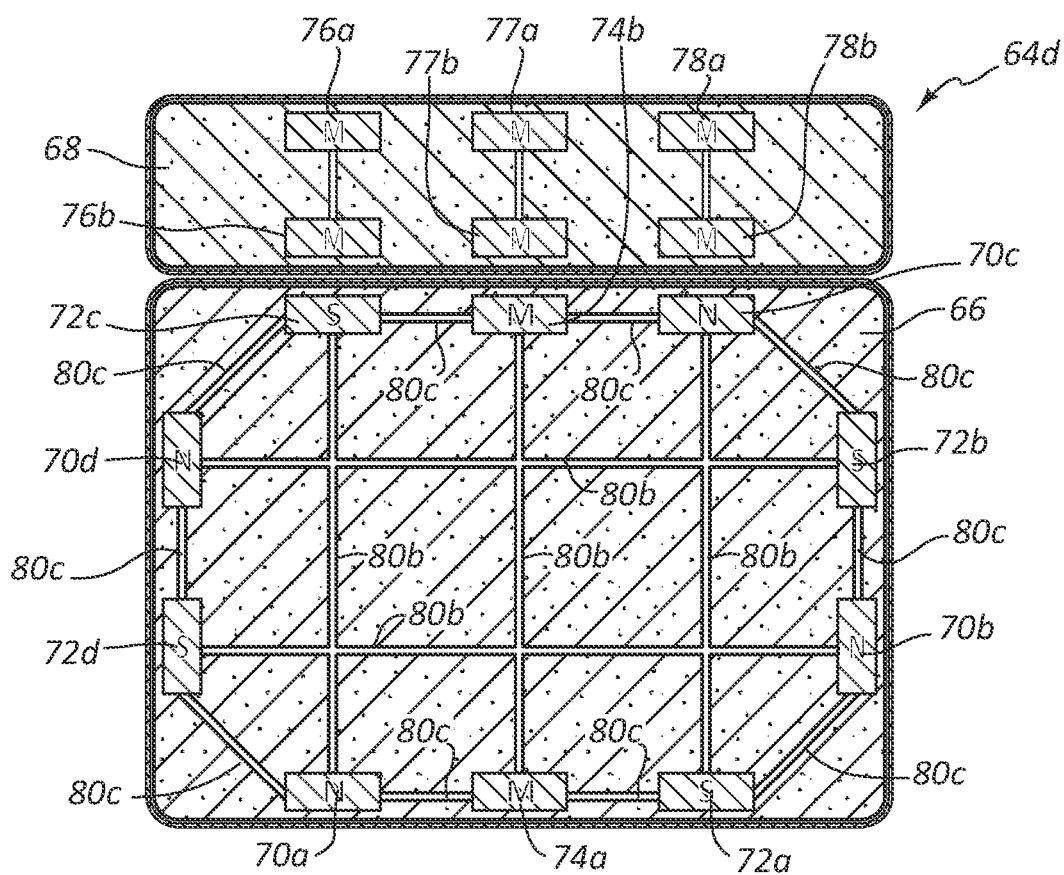

For example, FIG. 8C is a cross-sectional representations of a similar modular furniture assembly 64*b* showing a linking assembly 80*b* comprised of a unified cord assembly 80*b* having multiple end connections that connects to individual magnets and metallic members. FIG. 8D is a cross-sectional representations of a similar modular furniture assembly 64*c* showing a linking assembly comprised of individual cords 80*c* or a long unified cord in a circular pattern that provides connections between individual magnets and metallic members. FIG. 8E is a cross-sectional representation of a similar modular furniture assembly 64*d* showing another linking assembly comprised of individual cords 80*d* or a long unified cord in a circular pattern and a unified cord assembly within the central portion of the foam body that provides connections between individual magnets and metallic members.

Thus, by employing a magnetic coupling assembly similar to that shown in FIGS. 1-5B, the furniture assembly of FIGS. 7A-9I can be conveniently formed.

The bodies 67 and 69 of respective bases 66 and transverse members 68 may be comprised of a variety of different materials such as foam, wood, combinations of foam and wood, metallic materials, and/or a variety of different materials as may be suitable for providing furniture, such as furniture for toddlers.

When bodies 67 and 69 are comprised entirely or substantially of foam, it is convenient for a toddler to play with the foam members and to orient them into desired furniture positions. The magnetic coupling assembly helps to orient the furniture into proper positions, while the toddler is able to both reorient the base 66 and transverse member 68 into different positions and play with the foam members.

As shown in FIGS. 8*a*-8*e*, the magnetic members are offset from each other in an alternating polar relationship about the periphery of the oblong rectangular shaped base 66. Metallic members are between magnets on the sides of base 66. The opposite polar orientations of respective magnets enable the furniture assemblies to be positioned in relation to each other such that the proper alignments are formed as shown in FIGS. 1A-9I.

Thus, employing the magnetic coupling assembly of FIGS. 8A-8*e*, two bases can be combined to form a couch-like structure of FIG. 9B, a chair can be formed as shown in FIG.

9C, a chaise may be formed as shown in FIG. 9D, a couch 84 may be formed or a sectional 86, 88, or crib 90 may be formed as shown in respect to the figures. A bed 92 may be also shown in FIG. 9I.

It is also possible to achieve additional positions by turning base(s) 66 upside down from the orientation shown in FIG. 7A and achieving additional relationships with other base(s) 66 and transverse member(s) 68.

FIG. 10 shows an example of a method of linking magnets together for use in the embodiments of FIGS. 7a-9I, for example. Metallic members may be linked in the same fashion.

The height "H" of the transverse member 14 is significantly greater than the height "H" of the base member 12. In one embodiment, "significantly greater" means that the transverse member is at least 20% greater in height than the base member.

In one embodiment, in which the assembly 64a is used for a modular furniture assembly for sitting and reclining, e.g., for toddlers other children, the dimensions of the base 66 are as follows: the length=about 17 inches, the height=about 10 inches, and the width=about 13 inches. In one such embodiment, the dimensions of transverse member 68 are as follows: the length=about 17 inches, the height=about 18 inches, and the width=about 4 inches. In one embodiment, the metallic members and magnets for assembly 64a are each in the range of approximately 2.5 inches to approximately 3 inches in diameter and are approximately 0.5 inch in thickness, for example.

The base members 66 and/or transverse members 68 may be manufactured to be comprised of a foam block that is covered by an inner cover, which is covered by an outer cover. The inner cover may comprise a non-woven fabric for example. The tethered magnets and/or metallic members may be linked within a respective foam block by extending a cord through a drilled hole or slit in the foam block, then attaching the magnet and/or metallic members to the cord in portions of the foam block that have been routed out or otherwise formed to receive the magnet and/or metallic members. The foam may be a high density foam that is configured to hold an individual and to hold the magnets and metallic members therein.

The tethered metallic member assemblies disclosed herein are examples of tethered attracted member assemblies. The metallic members discussed herein are examples of attracted members, which are attracted to magnets. The metallic members may, for example, comprise metal slugs. The metal slugs may be comprised of iron, or another metallic material, for example.

In one embodiment, the foam bodies of foam assemblies such as assemblies 64a of FIGS. 7a-7b, for example, do not have the recesses 38, 39 of the base 12 and transverse member 14 and do not have feet connected thereto.

In yet another embodiment of the present invention, the magnetic coupling assembly comprises an electromagnet that can be selectively turned off and on in order to selectively, removably couple the base and transverse members to each other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular furniture assembly configured such that the furniture assembly can be selectively positioned into various selected positions, the furniture assembly comprising:
    a base member;
    a transverse member; and
    a magnetic coupling assembly comprising corresponding components that are magnetically attracted to one another, a portion of which components are disposed within the base member, another portion of which components are disposed within the transverse member, the magnetic coupling assembly being configured to selectively orient the base member and the transverse member into desired positions and to selectively, removably couple the base member to the transverse member;
    such that the base member and the transverse member are magnetically attracted to each other;
    wherein: (a) components of the magnetic coupling assembly disposed within the base member are tethered to one another and spaced apart from one another; and/or (b) components of the magnetic coupling assembly disposed within the transverse member are tethered to one another and spaced apart from one another; and
    wherein the corresponding components of the magnetic coupling assembly are selected from the group consisting of magnets and metallic members.

2. A modular furniture assembly as recited in claim 1, wherein corresponding components of the magnetic coupling assembly comprise a plurality of magnets and a plurality of metallic members that are attracted to the plurality of magnets, and wherein the plurality of metallic members are tethered together in a tethered metallic member assembly.

3. A modular furniture assembly as recited in claim 2, wherein the plurality of magnets are tethered together in a tethered magnetic assembly.

4. A modular furniture assembly as recited in claim 1, wherein the base member comprises a foam body.

5. A modular furniture assembly as recited in claim 1, wherein the corresponding components of the magnetic coupling assembly include magnets that are spaced in an alternating polar relationship.

6. A modular furniture assembly as recited in claim 1, wherein the components that are disposed within the base member are disposed completely within the base member, and wherein the components that are disposed within the transverse member are disposed completely within the transverse member.

7. A modular furniture assembly as recited in claim 1, wherein (a) components of the magnetic coupling assembly disposed within the base member are tethered to one another by a cord; and/or (b) components of the magnetic coupling assembly disposed within the transverse member are tethered to one another by a cord.

8. A modular furniture assembly having a magnetic coupling assembly for selectively, removably coupling members of the modular furniture assembly in different configurations, the modular furniture assembly comprising;
    a base member;
    a transverse member, the transverse member having a height that is substantially greater than the base member; and
    a magnetic coupling assembly comprising corresponding components that are magnetically attracted to one another, a portion of which components are disposed completely within the base member, another portion of which components are disposed completely within the transverse member, the corresponding components of the magnetic coupling assembly comprising a plurality of magnets and a plurality of metallic members that are attracted to the plurality of magnets, wherein the plurality of magnets are positioned completely within one of the base member and the transverse member and wherein the plurality of metallic members are positioned completely within the other of the base member and the transverse member such that the base member and the transverse member are magnetically attracted to each other and can be selectively, removably coupled to each other such that different configurations can be formed;

wherein (a) the plurality of metallic members are tethered in a tethered metallic member assembly, and/or (b) the plurality of magnets are tethered in a tethered magnetic assembly.

9. A modular furniture assembly as recited in claim 8, wherein the plurality of metallic members are tethered in a tethered metallic member assembly.

10. A modular furniture assembly as recited in claim 9 wherein the plurality of magnets are tethered in a tethered magnetic assembly.

11. A modular furniture assembly as recited in claim 8 wherein the plurality of magnets are located within a body of the base member.

12. A modular furniture assembly as recited in claim 11, wherein the magnets are spaced in an alternating polar relationship about the periphery of the base member.

13. A modular furniture assembly as recited in claim 8, wherein the base member is an oblong rectangle and includes at least one magnet and at least one metallic member therein.

14. A modular furniture assembly as recited in claim 8, wherein the magnets are positioned along the base and spaced apart from one another by a given distance, and wherein the metallic members are spaced apart substantially the same given distance within the transverse member.

15. A modular furniture assembly having a magnetic coupling assembly, the modular furniture assembly comprising:
 a base member;
 a transverse member; and
 a magnetic coupling assembly, the magnetic coupling assembly comprising a tethered magnetic assembly and a tethered attracted member assembly, the tethered magnetic assembly comprising a plurality of magnets that are tethered to one another, and the tethered attracted member assembly comprising a plurality of metallic members that are tethered to one another;
 wherein metallic members of the attracted member assembly are attracted to magnets of the tethered magnetic assembly, the tethered magnetic assembly and the tethered attracted member assembly being disposed within one of: (i) the base member; and (ii) the transverse member, such that the base member and the transverse member are attracted to each other when they are placed in sufficient proximity to each other and such that the base member and the transverse member are selectively oriented into certain desired positions.

16. A modular furniture assembly as recited in claim 15 wherein the base member contains the tethered magnetic assembly and the transverse member contains the tethered attracted member assembly.

17. A modular furniture assembly as recited in claim 15, wherein the magnets of the tethered magnetic assembly are spaced in an alternating polar relationship about one of: (i) the base member and (ii) the transverse member.

18. A modular furniture assembly configured such that the furniture assembly can be selectively positioned into various selected positions, the furniture assembly:

a base member;
 a transverse member; and
 a magnetic coupling assembly comprising corresponding components that are magnetically attracted to one another, a portion of which components are disposed within the base member, another portion of which components are disposed within the transverse member, the magnetic coupling assembly being configured to selectively orient the base member and the transverse member into desired positions and to selectively, removably couple the base member to the transverse member;
 wherein corresponding components of the magnetic coupling assembly comprise a plurality of magnets and a plurality of metallic members that are attracted to the magnets such that the base member and the transverse member are magnetically attracted to each other;
 wherein (a) the plurality of metallic members are tethered together in a tethered metallic member assembly, and/or (b) the plurality of magnets are tethered together in a tethered magnetic assembly.

19. A modular furniture assembly configured for selectively, removably coupling members of the modular furniture assembly in different configurations, the furniture assembly comprising:
 a base member;
 a transverse member; and
 a magnetic coupling assembly comprising corresponding components that are magnetically attracted to one another, a portion of which components are disposed within the base member, another portion of which components are disposed within the transverse member, the magnetic coupling assembly being configured to selectively orient the base member and the transverse member into desired positions and to selectively, removably couple the base member to the transverse member;
 such that the base member and the transverse member are magnetically attracted to each other;
 wherein: (a) components within the base member are tethered to one another, spaced apart from one another, and selected from the group consisting of magnets and metallic members; and/or (b) components within the transverse member are tethered to one another, spaced apart from one another, and selected from the group consisting of magnets and metallic members.

20. A modular furniture assembly as recited in claim 19, wherein the corresponding components of the magnetic coupling assembly comprise a plurality of magnets and a plurality of metallic members, wherein the plurality of magnets are embedded within the base member and the plurality of metallic members are embedded within the transverse member.

21. A modular furniture assembly as recited in claim 19, wherein the corresponding components of the magnetic coupling assembly are fixedly disposed completely within the base member and transverse member.

22. A modular furniture assembly as recited in claim 19, wherein (a) components of the magnetic coupling assembly disposed within the base member are tethered to one another by a cord; and/or (b) components of the magnetic coupling assembly disposed within the transverse member are tethered to one another by a cord.

23. A modular furniture assembly configured such that the furniture assembly can be selectively positioned into various selected positions, the furniture assembly comprising:
 a base member;
 a transverse member; and
 a magnetic coupling assembly comprising components that are magnetically attracted to one another, the magnetic coupling assembly being configured to selectively orient the base member and the transverse member into desired positions and to selectively, removably couple the base member to the transverse member, the components of the magnetic coupling assembly comprising a plurality of magnets and a corresponding plurality of attracted members that are attracted to the magnets;

wherein the base member includes a first plurality of the components of the magnetic coupling assembly disposed therein;

wherein the transverse member includes a second plurality of the components of the magnetic coupling assembly disposed therein;

wherein (a) the first plurality of the components of the coupling assembly in of the base member are tethered together in a tethered assembly, and/or (b) the second plurality of the components of the coupling assembly in the transverse member are tethered together in a tethered assembly;

wherein each component of the first plurality of components is spaced apart from other components of the first plurality of components, and wherein each component of the second plurality of components is spaced apart from other components of the second plurality of components.

24. A modular furniture assembly as recited in claim 23, wherein the first plurality of the components in the base member comprise the plurality of magnets and/or the second plurality of the components in the transverse member comprise the plurality of attracted members.

25. A modular furniture assembly configured such that the furniture assembly can be selectively positioned into various selected positions, the furniture assembly having a seating surface, the modular furniture assembly comprising:

a base member including a first side, a second side, a third side, and a fourth side;

a separate transverse member; and at least one magnetic coupling assembly, each magnetic coupling assembly comprising a transverse member component, a first base member component, a second base member component, a third base member component and a fourth base member component, such that the transverse member is magnetically attracted to the base member when the transverse member is placed against the base member;

each of the four base member components being disposed within the base member, within a respective side of the base member, wherein the first base member component is positioned within the first side, the second base member component is positioned within the second side, the third base member component is positioned within the third side, and the fourth base member component is positioned within the fourth side of the base member;

the transverse member component being disposed within the transverse member so that the transverse member is selectively coupleable against any of the four sides of the base member by positioning the transverse member against any of the four sides of the base member;

wherein at least two of the base member components are tethered to one another.

26. A modular furniture assembly as recited in claim 25, wherein the transverse member is a rectangular prism.

27. A modular furniture assembly as recited in claim 25, wherein the base member and transverse member are both rectangular prisms.

28. A modular furniture assembly as recited in claim 25, further comprising a second transverse member defining a generally vertical backrest surface or armrest surface, without any horizontal seating surface.

29. A modular furniture assembly as recited in claim 28, further comprising third and fourth transverse members, each defining a generally vertical backrest surface or armrest surface, without any horizontal seating surface.

30. A modular furniture assembly as recited in claim 25, wherein each of the base member components are tethered.

31. A modular furniture assembly as recited in claim 25, wherein the four base member components are spaced apart from one another and are positioned within each of first, second, third, and fourth sides of the base member.

32. A modular furniture assembly as recited in claim 25, wherein a plurality of spaced apart transverse member components are positioned within a given side of the transverse member.

33. A modular furniture assembly as recited in claim 25, wherein the base member defines a generally horizontal seating surface and the separate transverse member defines a generally vertical backrest surface or armrest surface, without any horizontal seating surface, such that the entire seating surface of the assembly is defined by the base member, the transverse member including a first side, a second side, a third side, and a fourth side.

34. A modular furniture assembly configured such that the furniture assembly can be selectively positioned into various selected positions, comprising:

a base member;

a separate transverse member; and at least one magnetic coupling assembly, each magnetic coupling assembly comprising a transverse member component, a first base member components, and a second base member component, such that the transverse member is magnetically attracted to the base member when the transverse member is placed against the base member;

each of the base member components being disposed within a respective side of the base member, wherein the first base member component is positioned within a first side of the base member, and the second base member component is positioned within a second side of the base member;

the transverse member component being disposed within the transverse member, so that the transverse member is selectively coupleable against the base member by positioning the transverse member against the first side or the second side of the base member;

wherein the base member components are tethered to one another.

35. A modular furniture assembly as recited in claim 34, wherein the modular furniture assembly has a seating surface, the transverse member defining a vertical backrest surface or vertical armrest surface, without any horizontal seating surface, such that the entire seating surface of the assembly is defined by the base member.

36. A modular furniture assembly as recited in claim 34, further comprising a second transverse member defining a vertical backrest surface or armrest surface, without any horizontal seating surface.

37. A modular furniture assembly as recited in claim 36, further comprising third and fourth transverse members, each defining a vertical backrest surface or armrest surface, without any horizontal seating surface.

38. A modular furniture assembly as recited in claim 37, further comprising a second base member defining a horizontal seating surface, an entire seating surface of the assembly being defined by the first and second base members.

39. A modular furniture assembly as recited in claim 34, wherein the base member is a horizontally oriented rectangular prism including a first vertical side, a second vertical side, a third vertical side, and a fourth vertical side, and wherein the transverse member is a vertically oriented rectangular prism defining a vertical backrest surface or vertical armrest surface, the transverse member including a first vertical side, a second vertical side, a third vertical side, and a fourth vertical side.

40. A modular furniture assembly as recited in claim 34, wherein the base member components are tethered to one another by a cord.

41. A modular furniture assembly configured such that the furniture assembly can be selectively positioned into various selected positions, the furniture assembly comprising:
- a base member;
- a transverse member; and
- a magnetic coupling assembly comprising corresponding components that are magnetically attracted to one another, a portion of which components are disposed within the base member, another portion of which components are disposed within the transverse member, the magnetic coupling assembly being configured to enable a user to selectively orient the base member and the transverse member into desired positions and to selectively, removably couple the base member to the transverse member; such that the base member and the transverse member are magnetically attracted to each other;
- wherein: (a) components of the magnetic coupling assembly disposed within the base member are tethered to one another by a cord; and/or (b) components of the magnetic coupling assembly disposed within the transverse member are tethered to one another by a cord; and
- wherein components of the magnetic coupling assembly are selected from the group consisting of magnets and metallic members.

42. A modular furniture assembly as recited in claim 41, wherein: (a) the cord tethering components of the magnetic coupling assembly within the base member is a non-metallic cable; and/or (b) the cord tethering components of the magnetic coupling assembly within the transverse member is a non-metallic cable.

43. A modular furniture assembly as recited in claim 41, wherein: (a) the cord tethering components of the magnetic coupling assembly within the base member is selected from the group consisting of rope, string, plastic line, twine, and monofilament; and/or (b) the cord tethering components of the magnetic coupling assembly within the transverse member is selected from the group consisting of rope, string, plastic line, twine, and monofilament.

* * * * *